United States Patent
Feng et al.

(10) Patent No.: US 9,952,947 B2
(45) Date of Patent: Apr. 24, 2018

(54) METHOD AND SYSTEM FOR PROCESSING FAULT OF LOCK SERVER IN DISTRIBUTED SYSTEM

(71) Applicant: HUAWEI TECHNOLOGIES CO., LTD., Shenzhen, Guangdong (CN)

(72) Inventors: Rui Feng, Beijing (CN); Jun Liu, Shenzhen (CN); Guangyou Xiang, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/592,217

(22) Filed: May 11, 2017

(65) Prior Publication Data

US 2017/0242762 A1 Aug. 24, 2017

Related U.S. Application Data

(63) Continuation of application No. PCT/CN2014/090886, filed on Nov. 12, 2014.

(51) Int. Cl.
| | |
|---|---|
| G06F 11/07 | (2006.01) |
| G06F 11/20 | (2006.01) |
| H04L 29/08 | (2006.01) |

(52) U.S. Cl.
CPC .......... *G06F 11/203* (2013.01); *H04L 67/10* (2013.01); *G06F 2201/805* (2013.01)

(58) Field of Classification Search
CPC ............ G06F 11/2023; G06F 11/2028; G06F 11/2033
(Continued)

(56) References Cited

U.S. PATENT DOCUMENTS

| | | |
|---|---|---|
| 6,173,293 B1 | 1/2001 | Thekkath et al. |
| 6,601,070 B2 | 7/2003 | Zhang et al. |

(Continued)

FOREIGN PATENT DOCUMENTS

| | | |
|---|---|---|
| CN | 1336589 A | 2/2002 |
| CN | 101252603 A | 8/2008 |

(Continued)

OTHER PUBLICATIONS

Chai meng-zhu. Design and implementation of fault tolerant mechanism of lock server based on distributed system. Journal of Nanchang College of Education. vol. 28 No. 10. Dec. 31, 2013. total 2 pages.

(Continued)

*Primary Examiner* — Chae M Ko
(74) *Attorney, Agent, or Firm* — Huawei Technologies Co., Ltd.

(57) ABSTRACT

A method for processing a fault of a lock server in a distributed system is disclosed, where the distributed system includes m lock servers, which locally store same lock server takeover relationship information. Lock servers in the distributed system that are not faulty receive a notification message, which carries information about a fault of a first lock server; after receiving the notification message, a second lock server determines that it is a takeover lock server of the first lock server according to the lock server takeover relationship information, and the takeover lock server enters a silent state; after receiving the notification message, a third lock server in the distributed system determines that it is not the takeover lock server of the first lock server according to the lock server takeover relationship information. After receiving a locking request, the third lock server allocates lock permission information according to the locking request.

23 Claims, 15 Drawing Sheets

(58) Field of Classification Search
USPC .................................................. 714/4.11, 6.3
See application file for complete search history.

(56) References Cited

U.S. PATENT DOCUMENTS

| | | | |
|---|---|---|---|
| 7,162,666 B2 | 1/2007 | Bono | |
| 7,356,531 B1* | 4/2008 | Popelka | G06F 11/2028 |
| | | | 707/682 |
| 7,693,892 B2 | 4/2010 | Koarashi | |
| 8,296,599 B1* | 10/2012 | Boyer | G06F 11/203 |
| | | | 714/4.11 |
| 8,307,212 B2 | 11/2012 | Van Wie | |
| 8,533,171 B2 | 9/2013 | Patwardhan | |
| 8,661,005 B2 | 2/2014 | McKenney et al. | |
| 8,666,952 B2 | 3/2014 | McKenney et al. | |
| 8,856,583 B1* | 10/2014 | Visser | G06F 11/2094 |
| | | | 714/4.11 |
| 8,874,535 B2 | 10/2014 | McKenney | |
| 2002/0065916 A1 | 5/2002 | Ooe et al. | |
| 2002/0073354 A1 | 6/2002 | Schroiff et al. | |
| 2004/0210673 A1* | 10/2004 | Cruciani | H04L 67/1097 |
| | | | 709/246 |
| 2004/0220913 A1* | 11/2004 | Walker | G06F 9/466 |
| 2006/0212453 A1* | 9/2006 | Eshel | G06F 11/2025 |
| 2007/0005732 A1* | 1/2007 | Bankston | H04L 67/02 |
| | | | 709/219 |
| 2007/0214143 A1* | 9/2007 | Koarashi | G06F 17/30197 |
| 2009/0172139 A1 | 7/2009 | Wong et al. | |
| 2012/0226673 A1* | 9/2012 | Li | G06F 17/30171 |
| | | | 707/704 |
| 2012/0259820 A1* | 10/2012 | Patwardhan | G06F 17/30171 |
| | | | 707/674 |
| 2014/0019429 A1 | 1/2014 | Driesen et al. | |
| 2014/0136502 A1 | 5/2014 | Mohamed et al. | |
| 2014/0379645 A1* | 12/2014 | Wickremesinghe | G06F 11/203 |
| | | | 707/624 |
| 2015/0234857 A1* | 8/2015 | Li | G06F 17/30171 |
| | | | 707/704 |

FOREIGN PATENT DOCUMENTS

| | | |
|---|---|---|
| CN | 103297268 A | 9/2013 |
| JP | 2002163140 A | 6/2002 |
| JP | 2007241808 A | 9/2007 |
| JP | 2014142945 A | 8/2014 |
| WO | 2014205559 A1 | 12/2014 |

OTHER PUBLICATIONS

Yuji Fujiwara et al.,"The design and verification of distributed lock manager with fault tolerance",IPSJ SIG Technical Report,2011 Information Processing Society of Japan,with English abstract,total 8 pages.

* cited by examiner

METHOD AND SYSTEM FOR PROCESSING FAULT OF LOCK SERVER IN DISTRIBUTED SYSTEM

CROSS-REFERENCE TO RELATED APPLICATIONS

This application is a continuation in of International Application No. PCT/CN2014/090886, filed on Nov. 12, 2014, which is hereby incorporated by reference in its entirety.

TECHNICAL FIELD

The present application relates to a storage technology, and in particular, to a method and system for processing a fault of a lock server (master) in a distributed system.

BACKGROUND

Network attached storage (NAS) systems are widely used for sharing purpose in enterprises' distributed file systems due to its features such as ease of use, high efficiency, and ease of management. A typical networking environment of a NAS system is shown in FIG. 1.

In a NAS system, multiple read/write requests from different application hosts may be received for a same file. To avoid read/write collisions, when a read or write request for a file is received from an application host, a lock server in a node device needs to lock the file (lock permission) to prevent other concurrent and mutually exclusive accesses to the shared resource. When the read/write operation is complete, the file is released (unlocked). A correspondence between lock permission information and an application host may be stored in each node, or may be stored in a shared storage device. The shared storage device is independent of each node and can be accessed by each node. The shared storage device is not shown in FIG. 1.

Recently, as a virtualization technology develops, applications such as virtual desktop infrastructure (VDI), ORACLE database platforms, and structured query language (SQL) server database platforms begin to be installed in distributed systems, this imposes higher requirements on reliability of the distributed systems. When a fault occurs in a node device of a distributed system (e.g. a NAS system), the NAS system configures an Internet protocol (IP) address of the faulty node device on another node device in a manner of node device IP failover, so as to enhance reliability of the NAS system. The switchover is transparent to each application host, that is, each application host cannot perceive the IP failover between the node devices in the NAS system. This reduces impacts on applications in each application host.

Network file system (NFS) V3 is a protocol version that has been most widely used for the longest time so far. However, due to an imperfect definition of a lock in the protocol, the protocol relies on other auxiliary protocols such as network lock manager (NLM) and network status manager (NSM). Consequently, a lock restoration procedure in NFS V3 is complex.

As shown in FIG. 1, when a node device 1 is faulty, an IP address of the node device 1 is failed-over to a node device 2. That is, the IP address of the node device 1 is configured on the node device 2. The IP failover is transparent to an application host 1. The application host 1 does not know the change occurring between the node devices. In design schemes of some protocols, such as the NFS protocol and the server message block (SMB) protocol, for a high access efficiency of an application host, after an IP address of a faulty node device is failed-over to another node device, the application host may use a lock reclaim request to re-apply for lock permission of a file obtained by an application in the application host. In this way, a lock server in the distributed system needs to securely control a lock request, such as a lock reclaim request or a locking request; otherwise, data obtained by multiple application hosts may be inconsistent due to improper permission control, or even a problem of system breakdown is caused when multiple application hosts read/write data simultaneously.

Thus, when a node device in the distributed system is faulty, for example, when a lock server is faulty, all lock servers in the distributed system are silent, that is, lock servers enter a silent state. In this case, when receiving a lock reclaim request, a protocol server in the node device sends, according to information carried in the lock reclaim request or stored lock permission, the lock reclaim request to a corresponding lock server for processing. When receiving a locking request, the lock server directly returns a rejection response message to the requester. The locking request is used by an application in an application host to apply to the lock server for new lock permission of a file. That is, when the lock server in the node device is in the silent state, the distributed system can process only a lock reclaim request and cannot process a locking request. In this case, although only one lock server in the distributed system is faulty, a local problem becomes a global problem because all the lock servers are silent. In addition, a normal locking request cannot be processed, which may cause service interruption and reduce reliability of the distributed system.

SUMMARY

Embodiments of the present application provide a method and system for processing a fault of a lock server in a distributed system, aimed to resolve a problem in the prior art that when a lock server is faulty, all lock servers are silent and cannot process a locking request, which reduces reliability of the distributed system.

According to a first aspect, an embodiment of the present application provides a method for processing a fault of a lock server in a distributed system, where the distributed system includes at least three lock servers, and each lock server stores same lock server takeover relationship information; and the method includes the following steps:

receiving, by lock servers in the distributed system that are not faulty, a first notification message, where the first notification message carries information about a fault of a first lock server in the distributed system; determining, by a second lock server in the distributed system after receiving the first notification message, that the second lock server is a takeover lock server of the first lock server according to locally stored lock server takeover relationship information, where the takeover lock server enters a silent state; determining, by a third lock server in the distributed system after receiving the first notification message, that the third lock server is not the takeover lock server of the first lock server according to locally stored lock server takeover relationship information; and allocating, by the third lock server that is determined to be a non-takeover lock server when receiving a locking request, lock permission information according to the locking request.

With reference to the first aspect, in a first possible implementation manner of the first aspect, when receiving a lock reclaim request, the takeover lock server returns corresponding lock permission information according to a lock permission information table; and when receiving a locking request, the takeover lock server returns a rejection response message.

With reference to the first possible implementation manner of the first aspect, in a second possible implementation manner of the first aspect, the distributed system further includes at least three protocol servers and corresponding lock proxies, where a protocol server and a corresponding lock proxy are located in a same node device; and the method further includes: sending, by the protocol server after receiving a lock request, the lock request to the corresponding lock proxy, where the lock request is a lock reclaim request or a locking request.

With reference to the second possible implementation manner of the first aspect, in a third possible implementation manner of the first aspect, each lock proxy locally stores the lock server takeover relationship information and lock server management range information; and the method further includes: determining, by the lock proxy after receiving the lock request, a lock server for processing the lock request according to the locally stored management range information; if the lock server for processing the lock request that is determined according to the locally stored management range information is marked as a faulty state, determining, by the lock proxy according to the locally stored lock server takeover relationship, a takeover lock server of the lock server that is in the faulty state; and sending the received lock request to the takeover lock server.

With reference to the second possible implementation manner of the first aspect, in a fourth possible implementation manner of the first aspect, the lock server takeover relationship information is determined by using a consistent hashing ring; and the determining, by the third lock server according to locally stored lock server takeover relationship information, that the third lock server is not the takeover lock server of the first lock server is specifically: determining, by the third lock server according to a clockwise direction or a counterclockwise direction of a locally stored consistent hashing ring, that the third lock server is not the takeover lock server of the first lock server.

With reference to the fourth possible implementation manner of the first aspect, in a fifth possible implementation manner of the first aspect, each lock proxy locally stores the lock server takeover relationship information and lock server management range information, where the lock server management range information and the lock server takeover relationship information are determined by using the consistent hashing ring; after receiving a lock request, the lock proxy determines, according to a clockwise direction or a counterclockwise direction of a locally stored consistent hashing ring, a lock server for processing the lock request; if the lock server for processing the lock request that is in the locally stored consistent hashing ring is marked as a faulty state, the lock proxy determines, according to a same direction of the locally stored consistent hashing ring, a takeover lock server of the lock server for processing the lock request.

According to a second aspect, an embodiment of the present application provides a distributed system that implements processing of a fault of a lock server, including: at least three lock servers, where each lock server stores same lock server takeover relationship information; lock servers that are not faulty among the at least three lock server are configured to receive a first notification message, where the first notification message carries information about a fault of a first lock server; a second lock server is configured to determine that the second lock server is a takeover lock server of the first lock server according to locally stored lock server takeover relationship information, where the takeover lock server enters a silent state; and a third lock server is configured to determine that the third lock server is not the takeover lock server of the first lock server according to locally stored lock server takeover relationship information, where after receiving a locking request, the third lock server that is determined to be a non-takeover lock server allocates lock permission information according to the locking request.

According to a third aspect, an embodiment of the present application provides a lock server that implements fault processing in a distributed system, where the lock server includes a receiving module, a processing module, and a storage module, where the storage module stores lock server takeover relationship information; the receiving module is configured to receive a first notification message, and send the first notification message to the processing module, where the first notification message carries information about a faulty lock server; the processing module is further configured to: after receiving the first notification message, determine whether the lock server is a takeover lock server of the faulty lock server according to the lock server takeover relationship information; if the lock server is the takeover lock server of the faulty lock server, the lock server enters a silent state; the processing module is further configured to: after receiving a locking request: determine whether the lock server is in a silent state; if the lock server is not in the silent state, allocate lock permission information according to the locking request, or if the lock server is in the silent state, return a rejection response message; and send the allocated lock permission information or the rejection response message to the receiving module; and the receiving module is further configured to return the received lock permission information or the received rejection response message to a lock proxy.

According to a fourth aspect, an embodiment of the present application provides a lock server that implements fault processing in a distributed system, including: a memory, configured to store lock server takeover relationship information and a lock permission information table; an interface, configured to provide an external connection; a computer readable medium, configured to store a computer program; and a processor, connected to the memory, the interface, and the computer readable medium, and configured to implement, by running the program, the foregoing method for processing a fault of a lock server.

According to a fifth aspect, an embodiment of the present application provides a lock proxy apparatus that implements fault processing in a distributed system, including a receiving module, a processing module, a storage module, and a sending module. The receiving module is configured to receive a lock request sent by a protocol server, and send the received lock request to the processing module, where the lock request is a lock reclaim request or a locking request; the processing module is configured to: after receiving the lock request, determine, according to lock server management range information stored in the storage module, a lock server for processing the lock request, and send the received lock request to the sending module; and the sending module is configured to send the lock request to the determined lock server.

With reference to the fifth aspect, in a first possible implementation manner of the fifth aspect, lock server takeover relationship information and the lock server management range information are determined by using a consistent hashing ring; and that the processing module determines a lock server for processing the lock request according to lock server management range information stored in the storage module is specifically: the processing module determines, according to a clockwise direction or a counterclockwise direction of the consistent hashing ring, the lock server for processing the lock request; and that the processing module determines, according to lock server takeover relationship information stored in the storage module, a takeover lock server of the lock server for processing the lock request is specifically: the processing module determines, according to a same direction of the consistent hashing ring, the takeover lock server of the lock server for processing the lock request.

According to a sixth aspect, an embodiment of the present application provides a lock proxy device that implements fault processing in a distributed system, including: a memory, configured to store lock server takeover relationship information and lock server management range information; an interface, configured to provide an external connection; a computer readable medium, configured to store a computer program; and a processor, connected to the memory, the interface, and the computer readable medium, and configured to implement, by running the program, the foregoing method for processing a fault of a lock server.

According to a seventh aspect, an embodiment of the present application provides a lock manager that implements fault processing in a distributed system, including the foregoing lock server and the foregoing lock proxy apparatus.

In the embodiments of the present application, a lock server in a distributed system records takeover relationship information of lock servers. Therefore, when one of the lock servers is faulty, a takeover lock server of the faulty lock server is determined according to the takeover relationship information of the lock servers, and only the takeover lock server is silent, and non-takeover lock servers run normally and can process a locking request normally. In this method, when a lock server in the distributed system is faulty, an affected range can be minimized; only the takeover lock server is silent, and non-takeover lock servers run normally, which does not affect normal running of a service and enhances stability of the distributed system.

BRIEF DESCRIPTION OF DRAWINGS

FIG. 3-1 is a schematic diagram of a consistent hashing ring according to an embodiment of the present application;

FIG. 3-2 is a schematic diagram of another consistent hashing ring according to an embodiment of the present application;

FIG. 3-3 is a schematic diagram of an updated consistent hashing ring according to an embodiment of the present application;

FIG. 3-4 is a schematic diagram of still another consistent hashing ring according to an embodiment of the present application;

FIG. 3-5 is a schematic diagram of an updated consistent hashing ring according to an embodiment of the present application;

FIG. 4-1 is a schematic structural diagram of a distributed system that implements a method for processing a fault of a lock server according to an embodiment of the present application;

FIG. 4-2 is a schematic flowchart of a method for processing a fault of a lock server in a distributed system according to an embodiment of the present application;

FIG. 4-3 is a schematic flowchart of another method for processing a fault of a lock server in a distributed system according to an embodiment of the present application;

FIG. 5-1 is a schematic structural diagram of a distributed system that implements a method for processing a fault of a lock server according to an embodiment of the present application;

FIG. 5-2 is a schematic flowchart of a method for processing a fault of a lock server in a distributed system according to an embodiment of the present application;

FIG. 5-3 is a schematic diagram of a consistent hashing ring according to an embodiment of the present application;

FIG. 6-1 is a schematic structural diagram of still another distributed system that implements a method for processing a fault of a lock server according to an embodiment of the present application;

FIG. 6-2 is a schematic flowchart of a method for processing a fault of a lock server in a distributed system according to an embodiment of the present application;

DESCRIPTION OF EMBODIMENTS

To resolve a problem that when a lock server in a distributed system is faulty, all lock servers need to be silenced and, during a silent period, only lock reclaim requests can be processed and locking requests cannot be processed, embodiments of the present application provide a solution, in which each lock server in a distributed system stores lock server takeover relationship information. In this way, when a lock server is faulty, a takeover lock server of the faulty lock server is determined by using the lock server takeover relationship information. Other non-takeover lock servers (lock servers excluding the takeover lock server in the system) can process locking requests normally, thereby minimizing a range of impact of the faulty lock server and enhancing reliability of the entire system.

Figure 2:
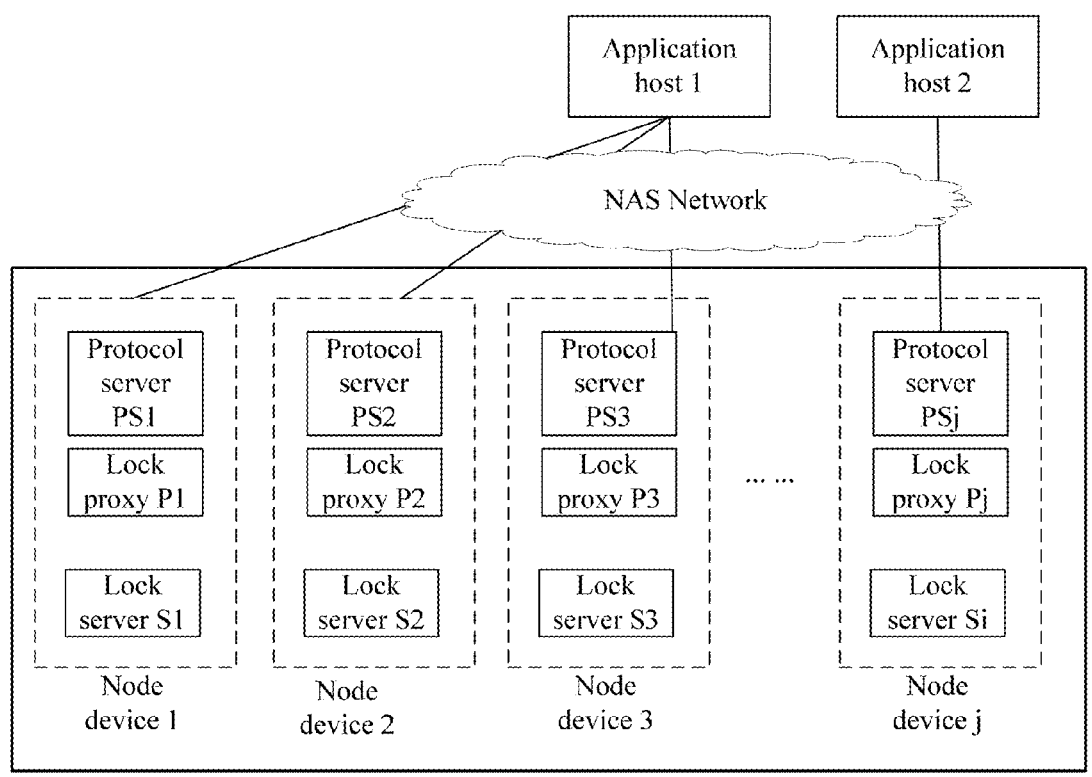
FIG. 2 is a schematic structural diagram of a distributed system according to an embodiment of the present application.

A distributed system according to an embodiment of the present application is shown in FIG. 2. Multiple application hosts are connected to multiple node devices by using a NAS network. Each node device includes a protocol server and a lock proxy. The protocol servers are servers that use different protocols, such as FC servers, NFS servers, and SMB servers, and a protocol server communicates with an upper-layer application host by using the NAS network. For different protocol servers, the operating principles are similar. A protocol server and a lock proxy are in a one-to-one correspondence and are located in a same node device. A lock proxy is further in a correspondence with a lock server; and the lock server may be located in a same node device as the protocol server and the lock proxy, or may be independently located in another node. In this embodiment of the present application, the lock server is located in a same node device as the protocol server and the lock proxy.

In the distributed system, a management node may be independently set up to control and manage all node devices, or one node device may control and manage other node devices. The node device that manages and controls other node devices is generally a primary node device, or may be called a management node device.

As shown in FIG. 2, the distributed system includes n node devices, where n is a natural number greater than 2. Each node device includes a protocol server PS and a lock proxy P. For ease of differentiation, the protocol server and the lock proxy in a node device 1 are denoted by PS1 and P1, respectively. Similarly, the protocol server and the lock proxy in a node device 2 are denoted by PS2 and P2, respectively. The rest can be deduced by analogy, and no description is further provided herein.

As described above, the lock server may be located in the same node device as the protocol server and the lock proxy, or may be located in a different node device. The lock server is denoted by S. The distributed system shown in FIG. 2 may include m lock servers, where m is a natural number greater than 2. One lock server may be corresponding to multiple lock proxies. That is, a lock server S1 may be corresponding to a lock proxy P1 in the node device 1, and may further be corresponding to a lock proxy P2 in the node device 2.

For clarity, in FIG. 2, a lock server is located in a same node device as a protocol server and a lock proxy. For example, the lock server S1, the lock proxy P1, and the protocol server PS1 are located in the node device 1; a lock server S2, the lock proxy P2, and the protocol server PS2 are located in the node device 2; and the rest can be deduced by analogy. In this case, one lock server may still be corresponding to multiple lock proxies. However, in this case, the lock proxies may share information stored in the lock server in a same node. Therefore, a cache of the lock proxy may store relatively small amount of information.

In this embodiment of the present application, when a lock server in a distributed system is faulty, another lock server in the distributed system may take over a lock-related service of the faulty lock server, where the lock server that takes over the lock-related service of the faulty lock server is called a takeover lock server. When a lock server is faulty, a lock-related service of the faulty lock server may be taken over by one takeover lock server, or a lock-related service of the faulty lock server may be taken over by multiple takeover lock servers. In the following, a case in which a lock-related service of the faulty lock server is taken over by one takeover lock server is used for description. When there are multiple takeover lock servers, an implementation principle of the multiple takeover lock servers is similar, but an algorithm needs to be preset to allocate the lock-related service of the faulty lock server among the multiple takeover lock servers. Details are not described herein again.

Figures 1, 3:
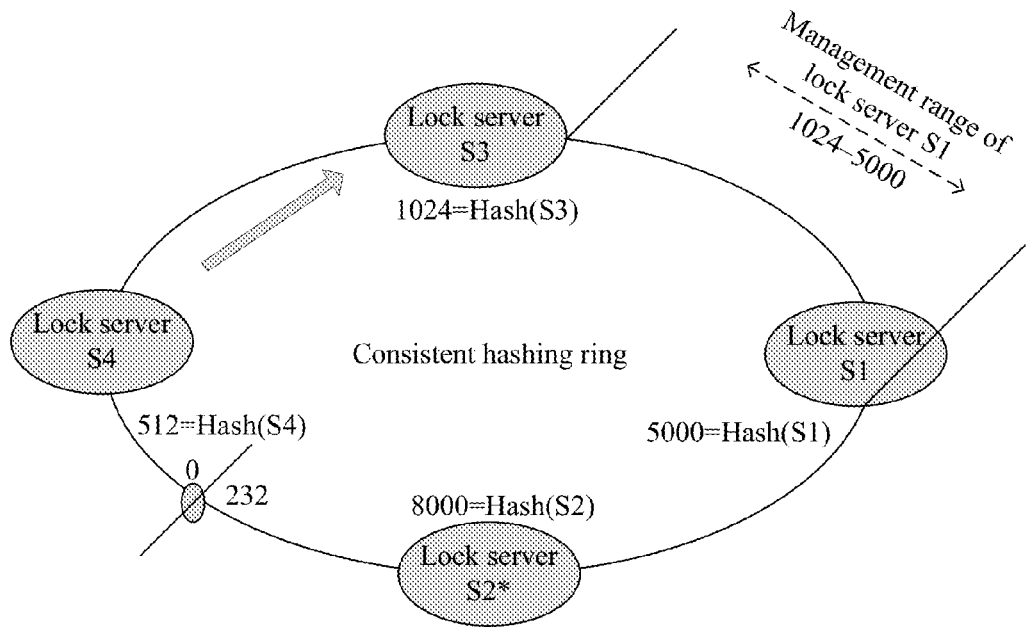
Figures 2, 3:
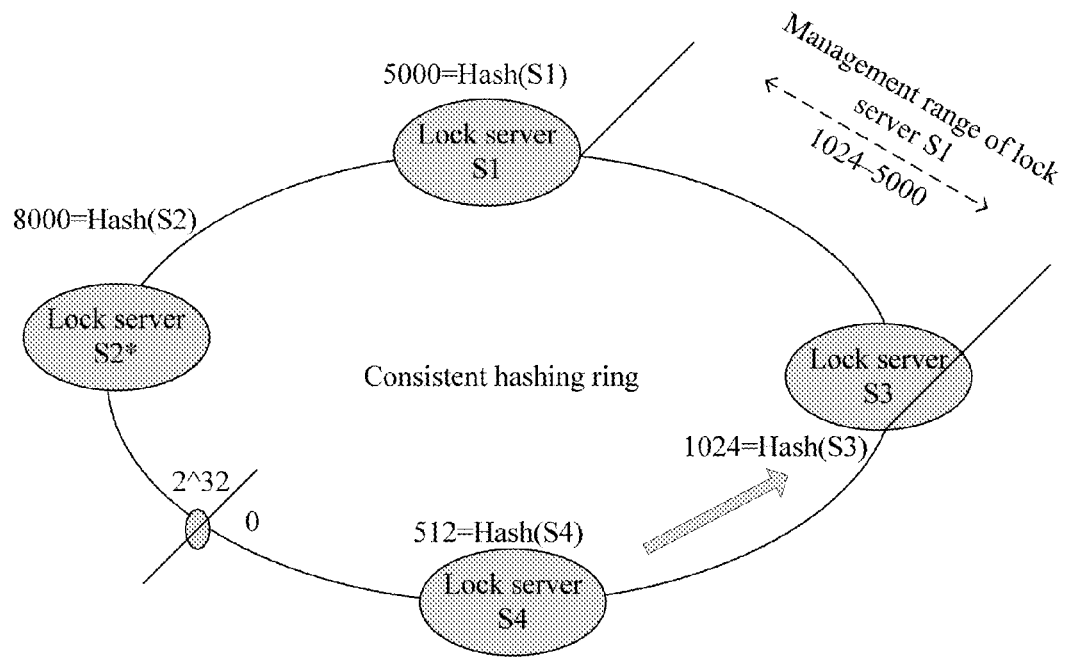
Figure 3:
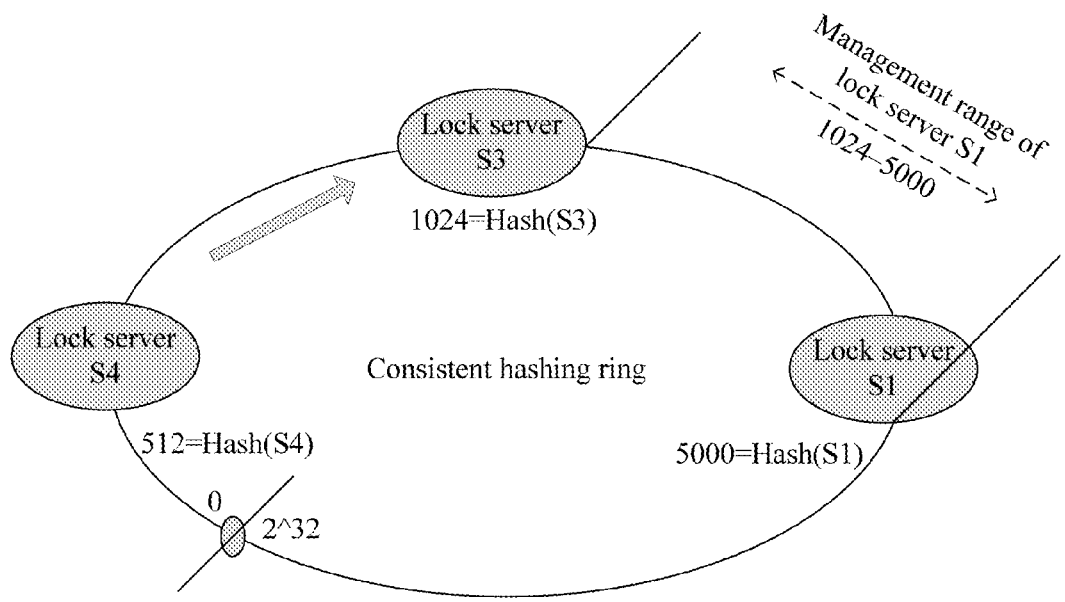

In this embodiment of the present application, lock server takeover relationship information can be recorded in two manners. One manner is to record the information by using a table (as shown in Table 1), and the other manner is to determine the information by using a consistent hashing ring (as shown in FIG. 3).

In this embodiment of the present application, a distributed system with four lock servers is used as an example for description, where the four lock servers are S1, S2, S3, and S4. The lock server takeover relationship information is recorded by using a table, as shown in Table 1 (lock server takeover relationship table). The lock server takeover relationship table is configured by a management node and sent to all lock servers for storing, or may be separately configured in each lock server.

TABLE 1

| Lock Server Takeover Relationship Table | |
|---|---|
| lock server | takeover lock server |
| S1 | S2 |
| S2 | S4 |
| S4 | S3 |
| S3 | S1 |

As shown in Table 1, when the lock server S1 is faulty, lock servers in the distributed system that are not faulty receive a notification message. After receiving the notification message, each of the lock servers in the distributed system that are not faulty determines whether the lock server is a takeover lock server of the faulty lock server S1 according to a locally stored lock server takeover relationship table. As shown in Table 1, lock server S2 determines that S2 is a takeover lock server of the lock server S1; S3 determines that S3 is not a takeover lock server of the lock server S1; and S4 determines that S4 is not a takeover lock server of the lock server S1. According to the determination result, the lock server S2 enters a silent state and processes only lock reclaim requests but does not process locking requests, while lock servers S3 and S4 are not silent and can normally process locking requests.

This embodiment of the present application further provides another manner of recording lock server takeover relationship information, that is, to determine a takeover relationship between the lock servers in the distributed system according to a specific sequence of a consistent hashing ring.

When a lock server is located in a same node device as a lock proxy and a protocol server, a consistent hashing ring may be obtained by using a consistent hashing algorithm based on a name of the node device, or a consistent hashing ring may be obtained by using a consistent hashing algorithm based on an IP address of the node device. When a lock server is not located in a same node device as a lock proxy and a protocol server, a consistent hashing ring may be obtained by using a consistent hashing algorithm based on a name or an ID of the lock server. Certainly, a consistent hashing ring may also be obtained by using a consistent hashing algorithm based on another identifier. In this embodiment of the present application, that hashing calculation is performed by using a consistent hashing algorithm based on an ID of a lock server to obtain a consistent hashing ring is used as an example for description.

The management node configures in advance, in each lock server, information such as a consistent hashing algorithm and a rule for determining a lock server takeover relationship. In this way, after the system is initialized and starts, each lock server performs corresponding hashing calculation according to the pre-configured information to obtain a consistent hashing ring indicating the lock server takeover relationship. Because algorithms, parameters, and range determining rules are all the same, each lock server obtains a same consistent hashing ring through calculation. Certainly, the management node may also perform calculation according to pre-configured information to obtain a consistent hashing ring, and then broadcasts the consistent hashing ring obtained through calculation to each lock server. The management node and each lock server may further separately perform calculation to obtain a consistent hashing ring. In this case, because the algorithms, parameters, and preset rules are all the same, the management node and each lock server separately obtain a same consistent hashing ring through calculation and determine a same takeover lock server.

Figure 1:
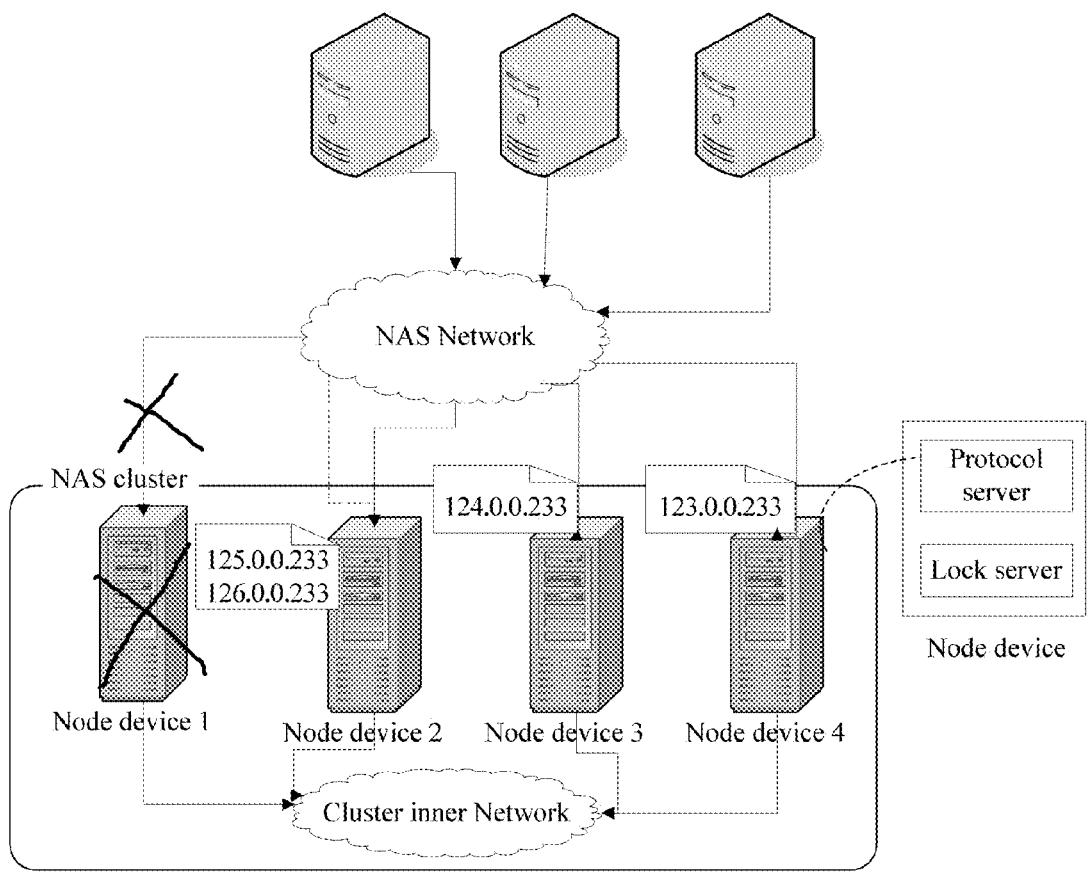
FIG. 1 is a schematic structural diagram of a distributed system in the prior art.

The following uses an example of performing hashing calculation based on an ID of each lock server to obtain a consistent hashing ring for description. For example, there are four lock servers in the distributed system, and IDs of the four lock servers are 1, 2, 3, and 4. Each lock server performs hashing calculation by using a consistent hashing algorithm based on an ID, and calculation results are arranged in ascending order according to a clockwise direction to obtain a consistent hashing ring. As shown in FIG. 3-1, the consistent hashing ring is $0$-$2^{32}$, and the results obtained by performing hashing calculation based on the IDs of the lock servers are hash(S1)=5000, hash(S2)=8000, hash(S3)=1024, and hash(S4)=512. According to the clockwise direction, starting from 0, positions of the lock servers on the hashing ring are sequentially the lock server S4, the lock server S3, the lock server S1, and the lock server S2.

Then, the calculation results may also be arranged in ascending order according to a counterclockwise direction to obtain a consistent hashing ring, as shown in FIG. 3-2. Positions of the lock servers on the hashing ring according to the counterclockwise direction are sequentially the lock server S4, the lock server S3, the lock server S1, and the lock server S2.

To determine a lock server takeover relationship, a takeover lock server can be determined according to a clockwise direction of a generated consistent hashing ring, or a takeover lock server can be determined according to a counterclockwise direction of a generated consistent hashing ring.

As shown in FIG. 3-1, the results of hashing calculation performed based on the ID of the lock servers are arranged on the consistent hashing ring according to the clockwise direction. If the lock server takeover relationship is determined according to the clockwise direction of the consistent hashing ring, the takeover lock server of the lock server S1 is S2; the takeover lock server of the lock server S2 is S4; the takeover lock server of the lock server S4 is S3; and the takeover lock server of the lock server S3 is S1. Similarly, if the lock server takeover relationship is determined according to the counterclockwise direction of the consistent hashing ring in FIG. 3-1, the takeover lock server of the lock server S1 is S3; the takeover lock server of the lock server S3 is S4; the takeover lock server of the lock server S4 is S2; and the takeover lock server of the lock server S2 is S1.

For the consistent hashing ring shown in FIG. 3-2, a takeover lock server may also be determined according to a clockwise direction of the consistent hashing ring, or according to a counterclockwise direction of the consistent hashing ring. The implementation principle is the same as that described in the foregoing paragraph, and no description is further provided herein by using an example.

Therefore, a lock server takeover relationship can be determined according to a clockwise direction of a consistent hashing ring generated based on identifiers of lock servers, or according to a counterclockwise direction of the consistent hashing ring.

When a lock server is located in a same node device as a lock proxy and a protocol server, a principle for determining a takeover relationship between lock servers is similar to that of the foregoing method. A difference lies in that a consistent hashing ring in this case may be obtained by using a consistent hashing algorithm based on a name of a node.

In this embodiment of the present application, a lock proxy in a node device also needs to store lock server takeover relationship information, and further needs to store lock server management range information. In this way, after receiving a lock request (such as a lock reclaim request or a locking request), the lock proxy determines, according to the stored lock server management range information, a lock server for processing the lock request. If the determined lock server for processing the lock request is faulty, the lock proxy determines a takeover lock server according to the lock server takeover relationship information, and sends the lock request to the takeover lock server for processing.

The lock server takeover relationship information stored by the lock proxy is the same as lock server takeover relationship information stored by the lock server. When a lock server takeover relationship table is used to record the lock server takeover relationship information, the lock server takeover relationship table is configured by the management node, and sent to all lock proxies for storing. When a consistent hashing ring is used to determine the lock server takeover relationship information, the consistent hashing ring may be obtained by the management node through calculation and then sent to each lock proxy. Alternatively, each lock proxy may be pre-configured by the management node, and then each lock proxy separately performs calculation to obtain a same consistent hashing ring. Further alternatively, the management node and each lock proxy may separately perform calculation to obtain a same consistent hashing ring, where the consistent hashing ring in the lock proxy is the same as the consistent hashing ring in the lock server. A manner of recording lock server takeover relationship information in a lock proxy is the same as a manner of recording lock server takeover relationship information in a lock server, which has been described above in detail, and no description is further provided herein.

In a case in which the lock server takeover relationship information in the lock proxy is recorded by using a lock server takeover relationship table, the lock server management range information in the lock proxy is also recorded by using a table (as shown in Table 2). The lock server management range information may be pre-configured by the management node and sent to each lock proxy in a form of a lock server management range recording table. The lock server management range recording table is shown in Table 2.

TABLE 2

| Lock Server Management Range Recording Table | |
|---|---|
| lock server | lock server management range |
| S1 | 1024-5000 |
| S2 | 5000-8000 |

TABLE 2-continued

Lock Server Management Range Recording Table

| lock server | lock server management range |
|---|---|
| S4 | 8000-512 |
| S3 | 512-1024 |

After receiving a lock request, the lock proxy performs hashing calculation by using a same consistent hashing algorithm based on an identifier of a file in the lock request, and determines, according to a range in which a calculation result falls, a corresponding lock server for processing the lock request. For example, if the lock request is a locking request, and a file carried in the locking request is (foo1.txt), the lock proxy performs hashing calculation on (foo1.txt), to obtain a result of 4500, which indicates that the locking request should be managed by the lock server S1, and the lock proxy sends the locking request to the lock server S1. For another example, if file information carried in a lock reclaim request is (foo8.txt), the lock proxy performs hashing calculation based on (foo8.txt), to obtain a result of 9000, which indicates that the lock reclaim request should be managed by the lock server S4, and the lock proxy sends the lock reclaim request to the lock server S4. If the lock server determined by the lock proxy according to the lock server management range information is faulty, the lock proxy further needs to determine a takeover lock server of the faulty lock server according to the lock server takeover relationship information.

The lock server management range information and the lock server takeover relationship information may be embodied in one table (for example: Table 3, lock server information table); or may be respectively stored in a lock server takeover relationship table and a lock server management range recording table, as shown in Table 1 and Table 2.

TABLE 3

Lock Server Information Table

| lock server | lock server management range | takeover lock server |
|---|---|---|
| S1 | 1024-5000 | S2 |
| S2* | 5000-8000 | S4 |
| S4 | 8000-512 | S3 |
| S3 | 512-1024 | S1 |

When a lock server is faulty, the lock proxy marks the faulty lock server as faulty in the lock server management range recording table, the lock server takeover relationship table, and/or the lock server information table. After receiving a lock request, the lock proxy performs hashing calculation based on a unique identifier of a file carried in the lock request, and determines a lock server management range in which a result obtained through calculation falls according to the lock server management range recording table or the lock server information table. If the determined lock server is faulty, the lock proxy determines a takeover lock server of the fault lock server according to the lock server takeover relationship table or the lock server information table, and sends the lock request to the takeover lock server for processing.

As shown in Table 3, the lock server S2 is faulty. If file information carried in a lock reclaim request received by the lock proxy is (foo5.txt), after the lock proxy performs hashing calculation on (foo5.txt) and obtains a result of 7000, according to the lock server management range information, the lock reclaim request should be processed by the lock server S2. However, currently, the lock server S2 is in a faulty state, according to the lock server takeover relationship information, a takeover lock server of the lock server S2 is the lock server S4. Therefore, the lock proxy sends the lock reclaim request to the takeover lock server S4 for processing.

When a preset time arrives, or after the lock proxy receives a second notification message from the management node, the lock proxy needs to update the lock server takeover relationship information and the lock server management range information that are stored, so that neither updated lock server takeover relationship information nor updated lock server management range information includes information about a faulty lock server. The second notification message is used to instruct the lock proxy to update the lock server takeover relationship information and the lock server management range information, and the second notification message carries information about the faulty lock server.

Certainly, the management node may also send updated lock server takeover relationship information and updated lock server management range information to each lock proxy. Using the lock server information in Table 3 as an example, an updated lock server information table is shown in Table 4.

TABLE 4

Updated Lock Server Information Table

| lock server | lock server management range | takeover lock server |
|---|---|---|
| S1 | 1024-5000 | S4 |
| S4 | 5000-512 | S3 |
| S3 | 512-1024 | S1 |

When the lock server takeover relationship in the lock proxy is determined by using a consistent hashing ring, in addition to the lock server takeover relationship that can be determined by using the consistent hashing ring, a management range of each lock server can also be determined by using the consistent hashing ring.

In this embodiment of the present application, information such as a same consistent hashing algorithm and a same rule for determining a lock server management range may also be configured in each lock proxy. In this way, after the system is initialized and starts, the lock proxies perform calculation according to the configured consistent hashing algorithm, the rule for determining a lock server management range, and the like, to obtain a consistent hashing ring. Information configured in the lock proxy, such as the consistent hashing algorithm and the rule for determining a lock server management range, must be the same as related information configured in the lock server, so that a consistent hashing ring obtained by the lock proxy through calculation is the same as a consistent hashing ring in the lock server. In this way, after receiving a lock request (such as a locking request or a lock reclaim request), the lock proxy may determine, according to the consistent hashing ring, a lock server for processing the lock request, and send the lock request to the determined lock server. If the determined lock server is faulty, the lock proxy may also determine a takeover lock server of the faulty lock server according to the consistent hashing ring, and sends the lock request to the takeover lock server for processing.

Similarly, after obtaining a consistent hashing ring through calculation, the management node may also broadcast the consistent hashing ring to each lock proxy and each lock server.

Figures 3, 4:
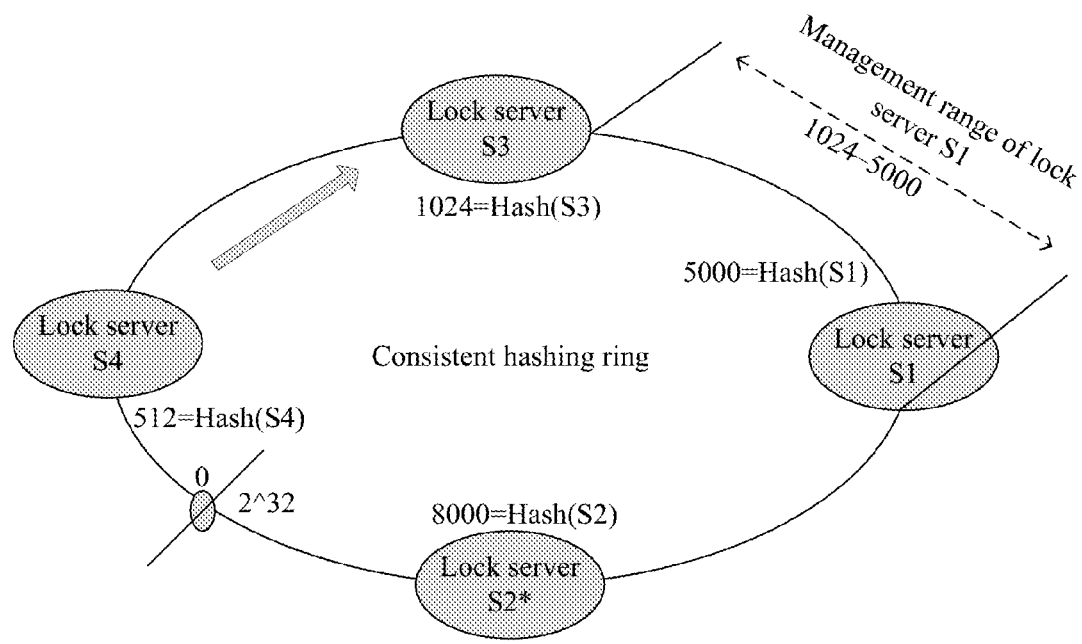

For example, the consistent hashing ring shown in FIG. 3-1 is generated according to a clockwise direction, and the lock server takeover relationship may be determined according to the clockwise direction of the consistent hashing ring. In this case, a lock server management range also needs to be determined according to the clockwise direction of the consistent hashing ring. As shown in FIG. 3-4, the takeover lock server of the lock server S1 is S2; the takeover lock server of the lock server S2 is S4; the takeover lock server of the lock server S4 is S3; and the takeover lock server of the lock server S3 is S1. A range (1024-5000) between the lock server S3 and the lock server S1 is a management range of the lock server S1, that is, the range between the lock server S3 and the lock server S1 is managed by the lock server S1 in a clockwise direction. Similarly, a range (5000-8000) between the lock server S1 and the lock server S2 is a management range of the lock server S2; a range (8000-512) between the lock server S2 and the lock server S4 is a management range of the lock server S4; and a range (512-1024) between the lock server S4 and the lock server S3 is a management range of the lock server S3.

For the consistent hashing ring shown in FIG. 3-1, the lock server takeover relationship may also be determined according to the counterclockwise direction of the consistent hashing ring. In this case, a management range of a lock server also needs to be determined according to the counterclockwise direction of the consistent hashing ring. A determining manner is the same as a method of determining the lock server takeover relationship according to the clockwise direction of the consistent hashing ring, and no description is further provided herein.

When an application host needs to access a file in the distributed system, the protocol server sends a locking request to the lock proxy, and the lock proxy performs hashing calculation based on a unique identifier (such as an FSID or an FID) of the file, and determines a range to which the file belongs according to a calculation result, and sends the locking request to a lock server that manages the range for corresponding processing. A hashing algorithm that is used to perform hashing calculation based on a unique identifier of a file needs to be the same as a hashing algorithm for generating a consistent hashing ring. For example, if file information carried in a locking request is (foo2.txt), and the lock proxy performs hashing calculation based on the file information (foo2.txt) and obtains a result of 6500, as can be seen, the value falls in the range between the lock server S1 and the lock server S2 on the consistent hashing ring, and the locking request is to be processed by the lock server S2.

When lock server S2 is faulty, the lock proxy marks the lock server S2 on the consistent hashing ring as faulty. In this case, after receiving a lock request, the lock proxy performs hashing calculation based on file information (foo3.txt) carried in the lock request and obtains a result of 7500. The value falls in the range between the lock server S1 and the lock server S2 on the consistent hashing ring, where the range is managed by the lock server S2. However, because the lock server S2 is in a faulty state, according to the consistent hashing ring, a takeover lock server of the lock server S2 is the lock server S4. Therefore, the lock proxy sends the lock request to the lock server S4 for processing.

When a preset time arrives, or after the lock proxy receives a second notification message from the management node, the lock proxy needs to update the lock server takeover relationship information and the lock server management range information that are stored, so that neither updated lock server takeover relationship information nor updated lock server management range information includes information about a faulty lock server. Certainly, the lock server takeover relationship information and the lock server management range information may also be updated by the management node, and then sent to each lock proxy and each lock server.

An updated consistent hashing ring is shown in FIG. 3-3. In this case, a management range of each lock server is updated as follows: the management range of the lock server S4 is (5000-512); the management range of the lock server S3 is (512-1024); and the management range of the lock server S1 is (1024-5000). The takeover lock server of the lock server S1 is S4; the takeover lock server of the lock server S4 is S3; and the takeover lock server of the lock server S3 is S1.

The consistent hashing ring shown in FIG. 3-2 is generated according to the counterclockwise direction, and then the lock server takeover relationship may be determined according to the counterclockwise direction of the consistent hashing ring. In this case, the management range of each lock server also needs to be determined according to the counterclockwise direction of the consistent hashing ring. For example, as shown in FIG. 3-2, the takeover lock server of the lock server S1 is S2; the takeover lock server of the lock server S2 is S4; the takeover lock server of the lock server S4 is S3; and the takeover lock server of the lock server S3 is S1. The range (5000-8000) between the lock server S1 and the lock server S2 is managed by the lock server S2; the range (8000-512) between the lock server S2 and the lock server S4 is managed by the lock server S4; the range (512-1024) between the lock server S4 and the lock server S3 is managed by the lock server S3; and the range (1024-5000) between the lock server S3 and the lock server S1 is managed by the lock server S1.

To determine the lock server takeover relationship according to the consistent hashing ring shown in FIG. 3-2, the lock server takeover relationship may also be determined according to the clockwise direction of the consistent hashing ring. In this case, the management range of each lock server also needs to be determined according to the clockwise direction of the consistent hashing ring. A determining manner is the same as a method of determining the lock server takeover relationship according to the counterclockwise direction of the consistent hashing ring, and no description is further provided herein.

For a method of obtaining a consistent hashing ring by using a consistent hashing algorithm based on a name of a node or an ID of a lock server, an existing technology can be used, and details are not described herein again.

When a new lock server is added to the distributed system, the management node device broadcasts a third notification message in the distributed system, where the third notification message is used to instruct a lock server to update a locally stored consistent hashing ring, and the third notification message carries information about the newly added lock server. The lock server and the lock proxy in the distributed system update locally stored lock server takeover relationship information or locally stored lock server management range information according to the information about the newly added lock server that is carried in the third notification message. Certainly, the lock server takeover relationship information and the lock server management range information may also be updated by the management node, and then sent to the lock proxies and the lock servers in the distributed system.

In a case in which the lock server takeover relationship information (as shown in Table 1) or the lock server management range information (as shown in Table 2) is recorded in a form of a table, when a lock server is added, the management node needs to update, through reconfiguration, the lock server takeover relationship or the lock server management range information. The management node may send an updated table to each lock server and each lock proxy; or may send a third notification message to each lock server and each lock proxy (that is, to broadcast the third notification message in the distributed system), to instruct the lock servers and the lock proxies to update the lock server takeover relationship or the lock server management range information. An updating rule may be set according to information such as a user requirement, a system load, and a traffic volume, which is not limited in this embodiment of the present application.

When a new lock server is added to the distributed system, updated lock server takeover relationship information and updated lock server management range information are shown in Table 5.

TABLE 5

Updated Lock Server Information Table

| lock server | lock server management range | takeover lock server |
|---|---|---|
| S1 | 1024-4000 | S2 |
| S2 | 4000-7000 | S5 |
| S5 | 7000-9000 | S4 |
| S4 | 9000-512 | S3 |
| S3 | 512-1024 | S1 |

When a consistent hashing ring is used to determine the lock server takeover relationship information or the lock server management range information, and when a new lock server is added, after detecting the new lock server, the management node broadcasts a third notification message in the distributed system, where the third notification message carries an ID of the new lock server (or other information that is used to perform calculation to obtain a consistent hashing ring). After receiving the third notification message, the lock servers and the lock proxies update a local consistent hashing ring according to the information carried in the third notification message. After receiving the third notification message, the lock servers (including the newly added lock server) and the lock proxies perform hashing calculation based on the ID of the lock server that is carried in the notification message; add the newly added lock server to the local consistent hashing ring according to a result of hashing calculation; and update, in the consistent hashing ring, a management range and a takeover relationship between the newly added lock server and an adjacent lock server on the consistent hashing ring according to a determined rule.

Figures 3, 4, 5:
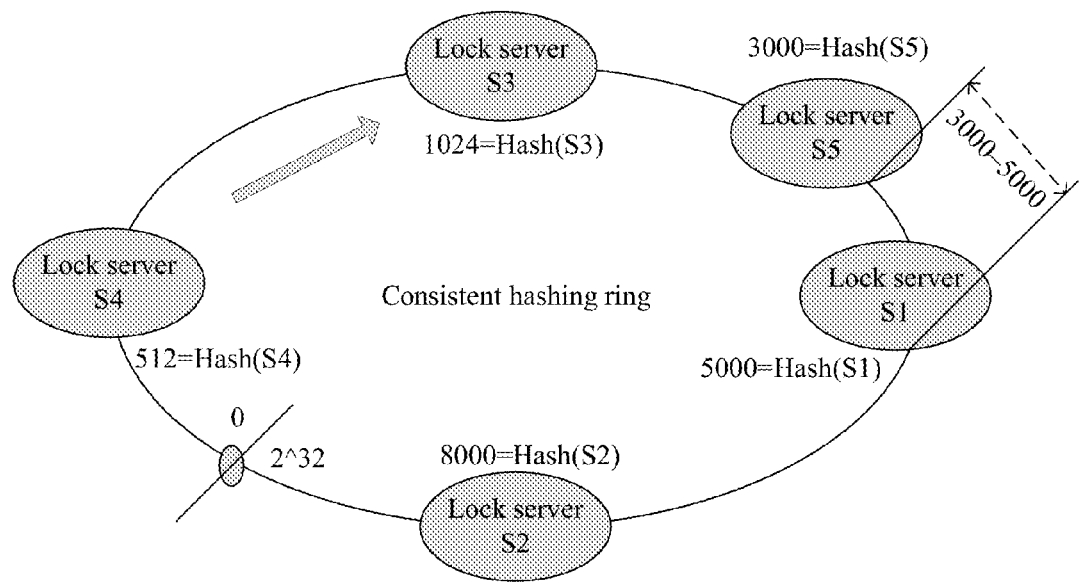
Figures 1, 4:
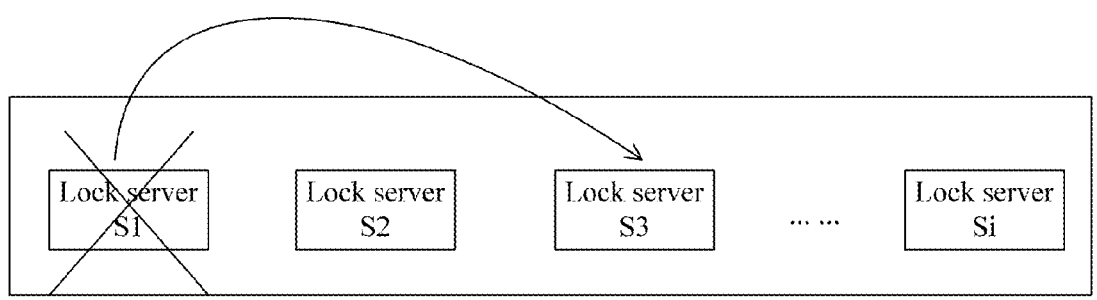
Figures 2, 4:
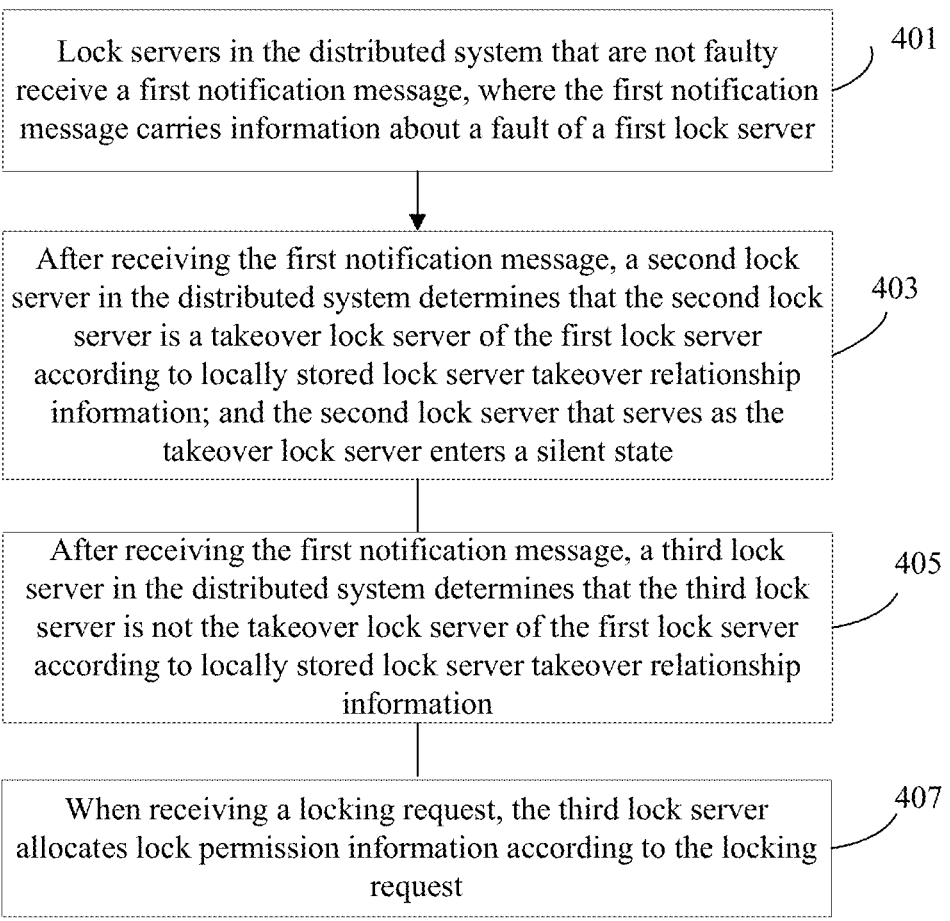
Figures 3, 4:
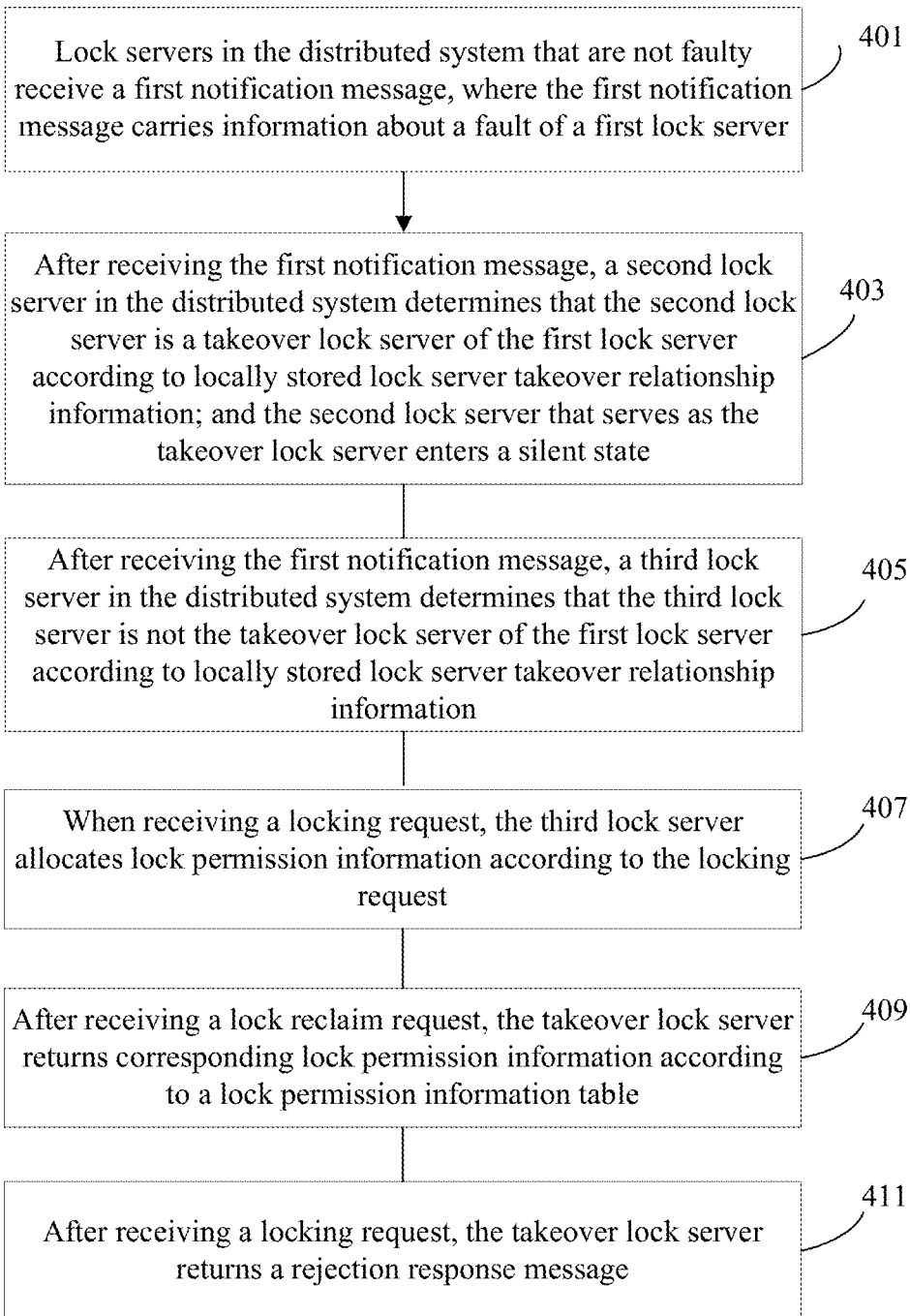
Figures 1, 5:
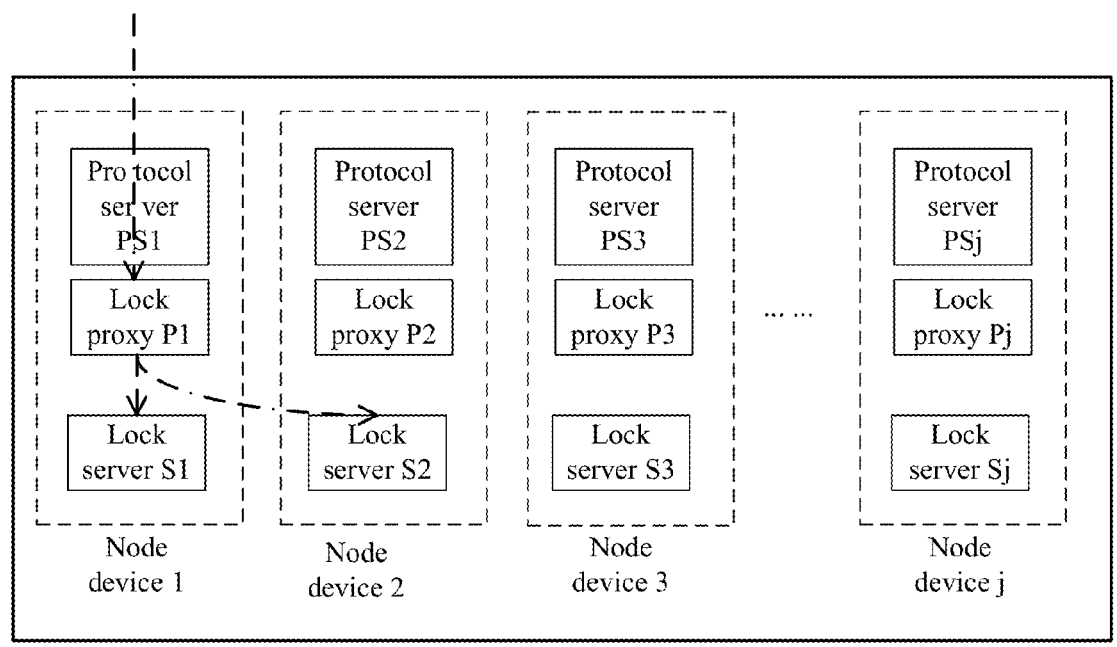
Figures 2, 5:
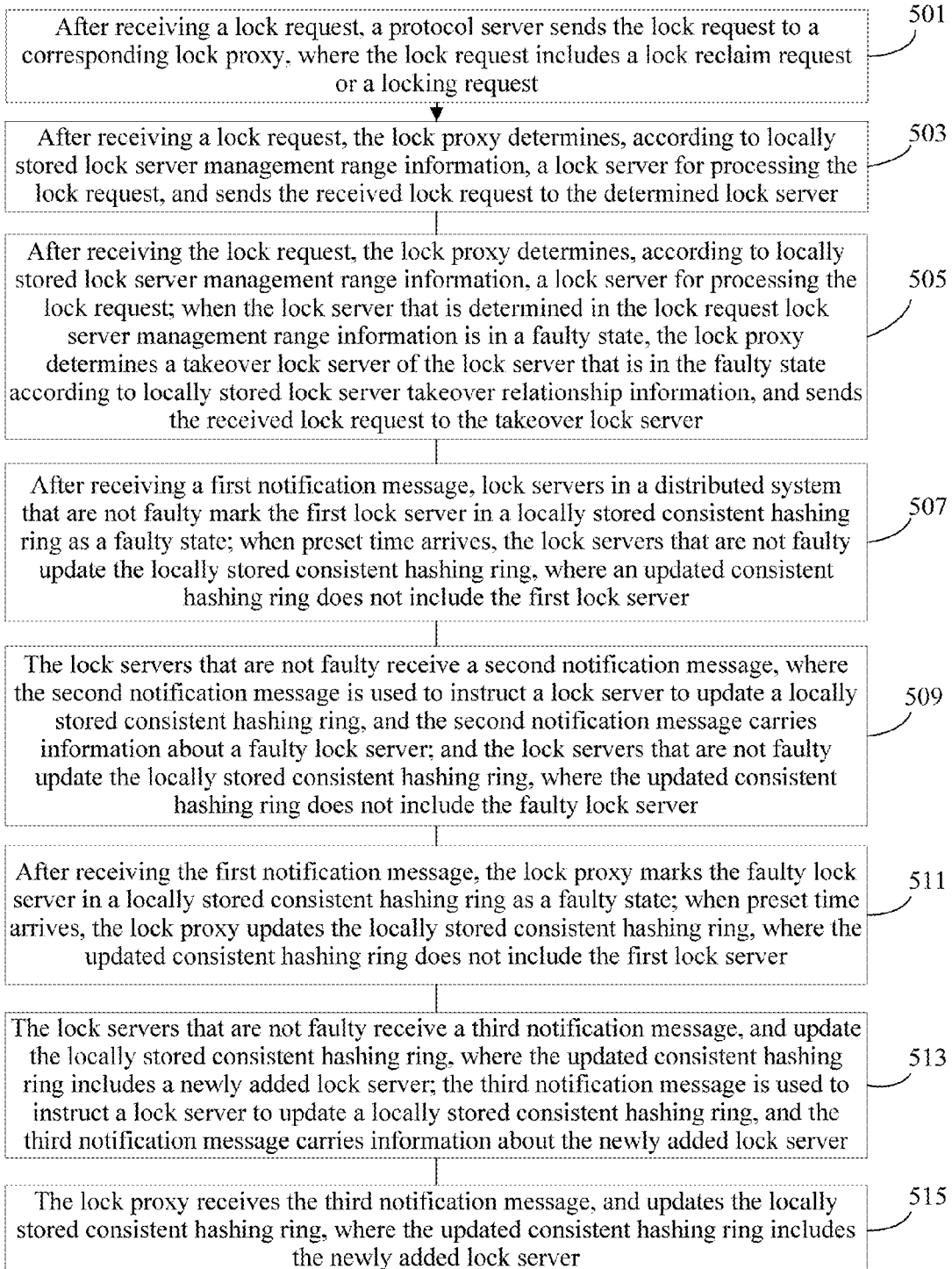
Figures 3, 5:
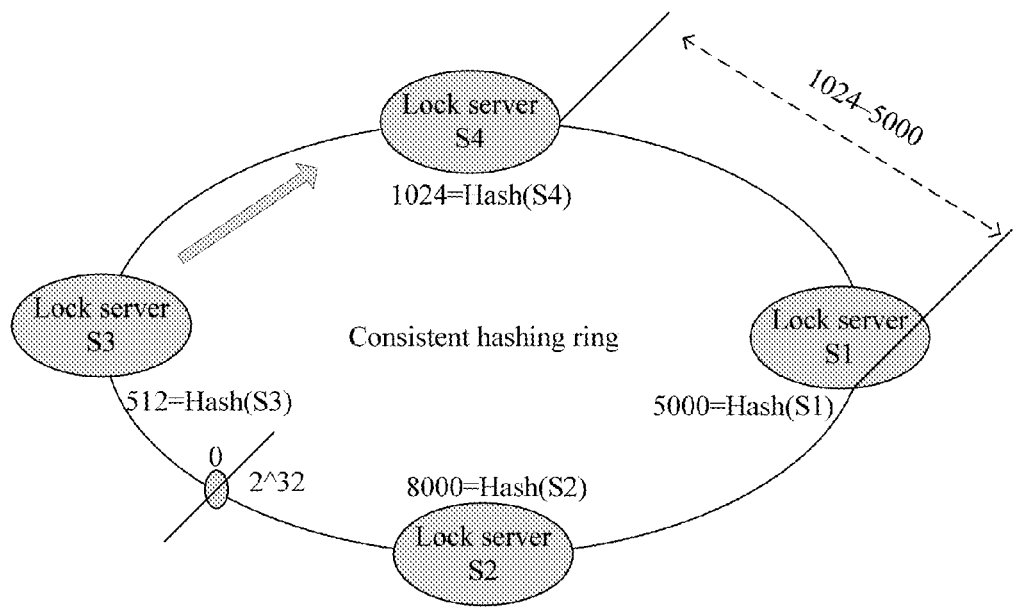

The consistent hashing ring shown in FIG. 3-1 is obtained through calculation according to an ID of a lock server and a clockwise principle. When a lock server (for example, S5) is added to the distributed system, the management node adds an ID of the lock server S5 in a third notification message and sends the third notification message to the lock servers in the distributed system. The lock servers perform hashing calculation by using a consistent hashing algorithm based on the ID of the lock server S5. Assuming that a result obtained through calculation is 3000, an updated consistent hashing ring is shown in FIG. 3-5, where the newly added lock server S5 is between the lock server S3 and the lock server S1 in the consistent hashing ring. Correspondingly, the takeover lock server of the lock server S3 is changed to the lock server S5, and the takeover lock server of the lock server S5 is the lock server S1; the management range of the lock server S1 is changed to (3000-5000), and the management range of the lock server S5 is (1024-3000). The takeover relationships and the management ranges of the other lock servers in the consistent hashing ring remain unchanged.

An embodiment of the present application provides a method for processing a fault of a lock server in a distributed system. A procedure of the method is shown in FIG. 4-2. The method is applicable to a distributed system shown in FIG. 4-1. In the distributed system in this embodiment of the present application, there are i lock servers, where i is a natural number greater than 2. For a purpose of differentiation, the lock servers are identified as a lock server S1, a lock server S2, a lock server S3, . . . , and a lock server Si.

When a lock server (for example, the lock server S1) in the distributed system is faulty, the procedure of the method for processing a fault of a lock server in the distributed system in this embodiment of the present application is as follows:

Step 401: Lock servers in the distributed system that are not faulty receive a first notification message, where the first notification message carries information about a fault of a first lock server.

When a lock server in the distributed system is faulty, after detecting that the lock server is faulty, a management node device broadcasts the first notification message, where the first notification message carries information about a fault of the faulty lock server S1. Lock servers in the distributed system that are not faulty can receive the first notification message.

Step 403: After receiving the first notification message, a second lock server in the distributed system determines that the second lock server is a takeover lock server of the first lock server according to locally stored lock server takeover relationship information; and the second lock server that serves as the takeover lock server enters a silent state.

All the lock servers in the distributed system locally store the lock server takeover relationship information. After receiving the first notification message, the lock server S2 determines that the lock server S2 is a takeover lock server of the lock server S1 according to the locally stored lock server takeover relationship information.

The lock server takeover relationship information records a takeover relationship between all the lock servers in the distributed system, that is, when a lock server is faulty, a takeover lock server of the faulty lock server takes over a service of the faulty lock server. For example, in this embodiment of the present application, the takeover lock server of the lock server S1 is the lock server S2. In this case, when the lock server S1 is faulty, a corresponding service of the lock server S1 is taken over by the lock server S2, and the lock server S2 is responsible for processing the original service of the lock server S1.

When entering a silent state, a takeover lock server can enter the silent state by enabling a silence timer. The takeover lock server may exit the silent state when the silence timer expires, or may be instructed by a management node to exit the silent state, or may exit the silent state after completing processing a lock reclaim request, which is not limited in this embodiment of the present application.

Step 405: After receiving the first notification message, a third lock server in the distributed system determines that the third lock server is not the takeover lock server of the first lock server according to locally stored lock server takeover relationship information.

In this embodiment of the present application, after receiving the first notification message, the lock server S3, determines that the lock server S3 is not a takeover lock server of the faulty lock server S1 according to the locally stored lock server takeover relationship information. After receiving the first notification message, the lock server S4, determines that the lock server S4 is not a takeover lock server of the faulty lock server S1 according to locally stored lock server takeover relationship information. The rest can be deduced by analogy. After receiving the first notification message, the lock server S1 determines that the lock server S1 is not a takeover lock server of the faulty lock server S1 according to locally stored lock server takeover relationship information.

Lock servers that are not a takeover lock server of a faulty lock server can be collectively called non-takeover lock servers. When a lock server is faulty, a takeover lock server of the faulty lock server takes over a service of the faulty lock server; and services of the non-takeover lock servers are not affected, that is, non-takeover lock servers can process the services normally.

However, in the prior art, when a lock server is faulty, all lock servers in a distributed system need to be silenced; a lock server in a silent state can process only a lock reclaim request, but cannot process a locking request. Therefore, once one of the lock servers is faulty, the entire distributed system cannot process a locking request, which causes service interruption, or even a problem of system breakdown when multiple clients read/write a file simultaneously. However, in this embodiment of the present application, a takeover relationship between lock servers is used; when one of the lock servers is faulty, only a takeover lock server of the faulty lock server is affected (the takeover lock server enters a silent state and can process only a lock reclaim request), and services of non-takeover lock servers are not affected, that is, the non-takeover lock servers can process a locking request. In this way, when a lock server in the distributed system is faulty, an affected range can be minimized, and a locking request can be processed, which ensures stability of the entire distributed system.

Lock server takeover information may be recorded in a manner of a lock server takeover information table; or hashing calculation may be performed by using a consistent hashing algorithm based on an ID of a lock server, a consistent hashing ring of lock servers can be obtained according to a specific rule, and a takeover relationship between the lock servers is determined according to the consistent hashing ring. Related content has been described above in detail, and details are not described herein again.

In this embodiment, the lock server S2 is the takeover lock server of the faulty lock server S1. In this case, for the faulty lock server S1, other lock servers are non-takeover lock servers.

Step 407: When receiving a locking request, the third lock server that serves as a non-takeover lock server allocates lock permission information according to the locking request.

After receiving a locking request, a lock server that is determined to be a non-takeover lock server allocates lock permission information according to the locking request.

In this embodiment of the present application, the lock server S3 is not a takeover lock server of the faulty lock server S1, that is, the lock server S3 is a non-takeover lock server of the faulty lock server S1 and is not silent. Therefore, when receiving a locking request, the lock server S3 allocates lock permission information according to the locking request. Similarly, as a non-takeover lock server of the faulty lock server S1, the lock server S4 can process a locking request.

In this embodiment of the present application, a non-takeover lock server of a faulty lock server does not need to be silenced. Therefore, when receiving a locking request, the non-takeover lock server allocates lock permission information according to the locking request. Processing performed by a non-takeover lock server after receiving a locking request is the same as that in the prior art, for example, checking whether there are mutually exclusive locking requests in a lock permission information table, to determine lock permission information to be allocated. Details are not described herein again.

In the method provided in this embodiment of the present application, when a lock server in a distributed system is faulty, an affected range can be minimized; services of non-takeover lock servers of the faulty lock server are not affected, and the non-takeover lock servers can process a locking request normally, thereby avoiding problems of service interruption and system instability in the distributed system.

In another embodiment of the present application, a flowchart of the method, as shown in FIG. 4-3, further includes the following steps:

Step 409: After receiving a lock reclaim request, the second lock server that serves as the takeover lock server returns corresponding lock permission information according to a lock permission information table.

When the takeover lock server is in a silent state, the takeover lock server can process a lock reclaim request. In this embodiment of the present application, after receiving the lock reclaim request, the takeover lock server S2 returns the corresponding lock permission information according to the lock permission information table. In NFS V3, after receiving the lock reclaim request, the takeover lock server returns an OK response message according to the lock permission information.

The lock permission information table stores information such as to-be-accessed file information, granted lock permission information, and to-be-accessed client information. Processing of a lock reclaim request may be implemented by using an existing implementation solution, and details are not described again in this embodiment of the present application. The lock permission information table may be stored in a shared storage device, and each lock server can access the lock permission information table to obtain information, or a lock information table may be locally stored in each lock server, and the management node is responsible for information synchronization. Details are not described again in this embodiment of the present application. A lock reclaim request is sent by a client. A specific triggering procedure is the same as an existing implementation manner, and details are not described again in this embodiment of the present application.

Step 411: After receiving a locking request, the second lock server that serves as the takeover lock server returns a rejection response message.

When the takeover lock server is in the silent state, the takeover lock server can process only a lock reclaim request and cannot process a locking request. In this embodiment of the present application, when the takeover lock server S2 is in the silent state, if the takeover lock server S2 receives a locking request, the takeover lock server S2 returns a rejection response message. Certainly, after meeting a condition and exiting the silent state, the takeover lock server can process a locking request. In this case, a processing manner is the same as a manner of processing a locking request by a non-takeover lock server, and details are not described herein again.

In addition to the lock servers, the distributed system also includes protocol servers and lock proxies. A protocol server and a lock proxy are in a one-to-one correspondence, and the protocol server and the lock proxy that are in the correspondence are located in a same node device. A protocol server may be corresponding to multiple lock proxies, and may be located in a same node with a protocol server and a lock proxy, or may be disposed in another node device.

An embodiment of the present application further provides another method for processing a fault of a lock server in a distributed system, and the method is applicable to a system shown in FIG. 5-1. A procedure of the method is shown in FIG. 5-2.

As shown in FIG. 5-1, there are j node devices in the distributed system, where j is a natural number greater than 2. Each node device includes a protocol server, a lock proxy, and a lock server. For example, a protocol server PS1, a lock proxy P1, and a lock server S1 are in a node device 1; a protocol server PS2, a lock proxy P2, and a lock server S2 are in a node device 2; and the rest can be deduced by analogy. A protocol server and a lock proxy are in a one-to-one correspondence. That is, after receiving a lock request, the protocol server PS1 sends the lock request to the lock proxy P1; after receiving a lock request, the protocol server PS2 sends the lock request to the lock proxy P2; and the rest can be deduced by analogy. A lock server may be corresponding to multiple lock proxies, that is, the lock server S1 may receive a lock request sent by the lock proxy P1, and may also receive a lock request sent by another lock proxy (for example, the lock proxy P2).

Steps implemented by a lock server in this embodiment are the same as the solution described in FIG. 4-2 and FIG. 4-3 and corresponding text, and no description is further provided herein.

Step 501: After receiving a lock request, a protocol server sends the lock request to a corresponding lock proxy, where the lock request may be a lock reclaim request or a locking request.

The protocol server is connected to an external protocol client, and is configured to receive a request from the protocol client and return a processing result to the protocol client. The protocol server may be a network file system (NFS) protocol server, or may be a server message block (SMB) protocol server, which is not limited in this embodiment of the present application. After receiving a lock request sent by the protocol client, the protocol server performs protocol conversion processing to convert the received lock request to a lock request of a distributed lock manager (DLM), and sends the converted lock request to a corresponding lock proxy. In this embodiment of the present application, the protocol server and the corresponding lock proxy are located in a same node device. Therefore, the protocol server sends the converted lock request to the lock proxy in the same node device. For example, after receiving a lock request, the protocol server PS2 sends a converted lock request to the lock proxy P2.

In the prior art, when a lock server is faulty, all lock servers in a distributed system enter a silent state. Therefore, after receiving a lock request, a protocol server only sends a lock reclaim request to a corresponding lock proxy. For a received locking request, the protocol server directly returns a rejection response message. That is, in the distributed system in the prior art, when a lock server is faulty, all the lock servers in the distributed system enter the silent state. In this case, the distributed system cannot process a locking request, which affects normal running of the distributed system and significantly affects stability of the distributed system.

However, in the solution provided in this embodiment of the present application, after a lock server is faulty, only a takeover lock server of the faulty lock server needs to enter a silent state, and non-takeover lock servers can process a service normally. After receiving a lock request (such as a locking request and a lock reclaim request), a protocol server sends the lock request to a corresponding lock proxy, and the lock proxy sends, according to a specific rule, the lock request to a lock server that is responsible for processing the lock request. In this case, only the takeover lock server in the silent state cannot process a locking request, non-takeover lock servers can process a locking request, and all lock reclaim requests can be processed. Therefore, most lock requests in the distributed system can be processed, which significantly enhances stability of the distributed system.

Step 503: After receiving the lock request, the lock proxy determines, according to locally stored lock server management range information, a lock server for processing the lock request, and sends the received lock request to the determined lock server.

Each lock proxy locally stores lock server management range information. After receiving the lock request sent by the protocol server, the lock proxy determines, according to the locally stored lock server management range information, a lock server that is responsible for processing the lock request, and sends the lock request to the determined lock server for processing.

When the lock server management range information is recorded by using a lock server management range information table, after receiving the lock request, the lock proxy performs hashing calculation on file information (such as a file ID) carried in the lock request. A lock server with a management range in which a calculation result falls is the lock server that is responsible for processing the lock request. The lock proxy sends the lock request to the determined lock server for processing.

When the lock server management range information is determined by using a consistent hashing ring, after receiving the lock request, the lock proxy performs hashing calculation on the file information (such as a file ID) carried in the lock request. A lock server with a management range in which a calculation result falls is the lock server that is responsible for processing the lock request. The lock proxy sends the lock request to the determined lock server for processing. A hashing algorithm that is used to perform hashing calculation on the file information carried in the lock request is the same as a consistent hashing algorithm that is used to generate a consistent hashing ring.

In this embodiment of the present application, when detecting that a lock server is faulty, a management node broadcasts a first notification message in a distributed system, where the first notification message carries information about the faulty lock server. Both a lock proxy and a lock server receive the first notification message. After receiving the first notification message, the lock proxy marks the faulty lock server as faulty in locally stored lock server management range information. Therefore, after the lock proxy receives a lock request, the lock server that is determined by the lock proxy according to lock server management range information and that is responsible for processing the lock request may be a faulty lock server. In this case, the lock proxy needs to determine a takeover lock server of the faulty lock server according to stored lock server takeover relationship information. The determining method is described in step 505.

Step 505: After receiving the lock request, the lock proxy determines, according to locally stored lock server management range information, a lock server for processing the lock request; when the lock server for processing the lock request that is determined in the lock request lock server management range information is in a faulty state, the lock proxy determines a takeover lock server of the lock server that is in the faulty state according to locally stored lock server takeover relationship information, and sends the received lock request to the takeover lock server.

When the lock server management range information is recorded by using a lock server management range information table, the lock server takeover relationship information is also recorded by using a lock server takeover relationship table. The lock server management range information and the lock server takeover relationship information may be recorded by using a same lock server information table. The lock server information table is shown in Table 3. The table records a management range of each lock server and a takeover relationship between the lock servers, which can be pre-configured according to a user requirement. A lock server information table and an updating status have been described above in detail, and details are not described herein again.

When the lock server management range information is determined by using a consistent hashing ring, the lock server takeover relationship information is also determined by using a same consistent hashing ring. As described above, if a lock server management range is determined according to a clockwise direction of a consistent hashing ring, a lock server takeover relationship also needs to be determined according to the clockwise direction of the consistent hashing ring. Similarly, if a lock server management range is determined according to a counterclockwise direction of a consistent hashing ring, a lock server takeover relationship also needs to be determined according to the counterclockwise direction of the consistent hashing ring.

As shown in FIG. 5-3, a range between the lock server S4 and the lock server S1 is managed by the lock server S1; a range between the lock server S1 and the lock server S2 is managed by the lock server S2; a range between the lock server S2 and the lock server S3 is managed by the lock server S3; and a range between the lock server S3 and the lock server S4 is managed by the lock server S4. A takeover lock server of the lock server S1 is the lock server S2; a takeover lock server of the lock server S2 is the lock server S3; a takeover lock server of the lock server S3 is the lock server S4; and a takeover lock server of the lock server S4 is the lock server S1.

In the technical solution provided in this embodiment of the present application, when a lock server in a distributed system is faulty, a protocol server may receive a lock request (such as a lock reclaim request or a locking request), and send the received lock request to a lock proxy. The lock proxy determines a lock server according to lock server management range information, and sends the lock request to the lock server for processing. If the determined lock server is a faulty lock server, the lock proxy further needs to determine, a takeover lock server of the faulty lock server according to lock server takeover relationship information, and sends the lock request to the takeover lock server for processing. During a silent period, the takeover lock server can process only a lock reclaim request and cannot process a locking request. In this way, an affected range of a faulty lock server is minimized, and most lock requests can be processed in a timely manner. This prevents service interruption caused by a failure to process a lock request in a timely manner, or prevents a problem of system breakdown caused by a service collision, and enhances stability of the distributed system.

In another embodiment of the present application, the method for processing a fault of a lock server in a distributed system may further include the following steps:

Step 507: After receiving a first notification message, lock servers in the distributed system that are not faulty mark a first lock server in a locally stored consistent hashing rings of the lock servers that are not faulty as a faulty state; when preset time arrives, the lock servers that are not faulty update the locally stored consistent hashing ring, where an updated consistent hashing ring does not include the first lock server.

When a lock server in the distributed system is faulty, lock servers in the distributed system that are not faulty receives the first notification message sent by the management node, where the first notification message carries an identifier of the faulty lock server. After receiving the first notification message, lock servers that are not faulty mark the faulty lock server in a locally stored consistent hashing rings of the lock servers that are not faulty as a faulty state. The lock servers that are not faulty may further enable a timer. When preset time arrives, the lock servers that are not faulty update the locally stored consistent hashing ring, where the updated consistent hashing ring does not include the faulty lock server.

Optionally, after receiving a notification from the management node, the lock servers in the distributed system that are not faulty may further update the locally stored consistent hashing ring. Similarly, the updated consistent hashing ring does not include the faulty lock server. A specific method is described in step 509.

Step 509: The lock servers that are not faulty receive a second notification message, where the second notification message is used to instruct a lock server to update a locally stored consistent hashing ring, and the second notification message carries information about the faulty lock server; and the lock servers that are not faulty update the locally stored consistent hashing ring, where the updated consistent hashing ring does not include the faulty lock server.

Step 511: After receiving the first notification message, the lock proxy marks the faulty lock server in a locally stored consistent hashing ring as a faulty state; when preset time arrives, the lock proxy updates the locally stored consistent hashing ring, where the updated consistent hashing ring does not include the first lock server.

There is no strict sequence between step 511 and step 507 or 509, and step 511 may be performed concurrently with step 507 or 509.

When a new lock server is added to the distributed system, this embodiment of the present application may further include the following steps:

Step 513: The lock servers that are not faulty receive a third notification message, and update the locally stored consistent hashing ring, where the updated consistent hashing ring includes a newly added lock server; the third notification message is used to instruct a lock server to update a locally stored consistent hashing ring, and the third notification message carries information about the newly added lock server.

Step 515: The lock proxy receives the third notification message, and updates the locally stored consistent hashing ring, where the updated consistent hashing ring includes the newly added lock server.

Steps 513 and 515 may be concurrently performed, and there is no strict sequence.

Figures 1, 6:
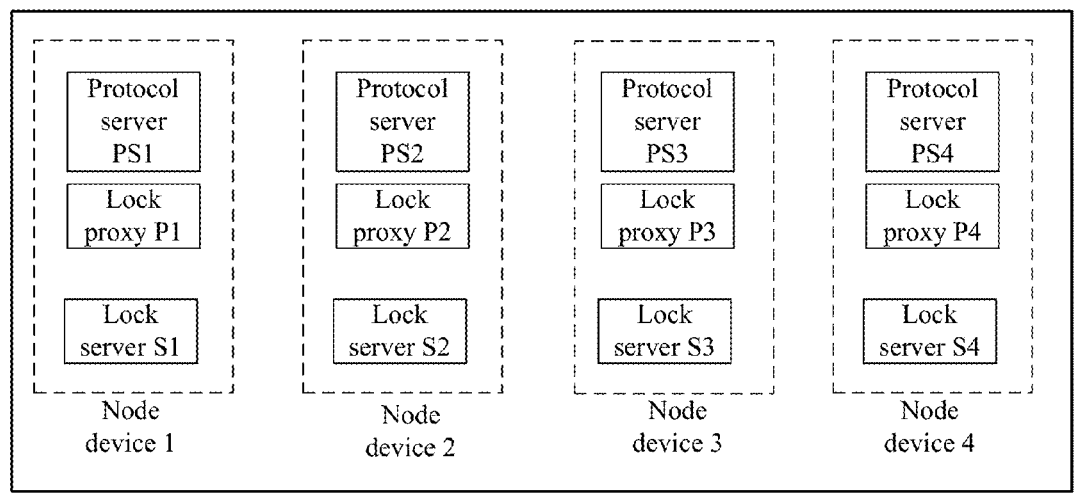
Figures 2, 6:
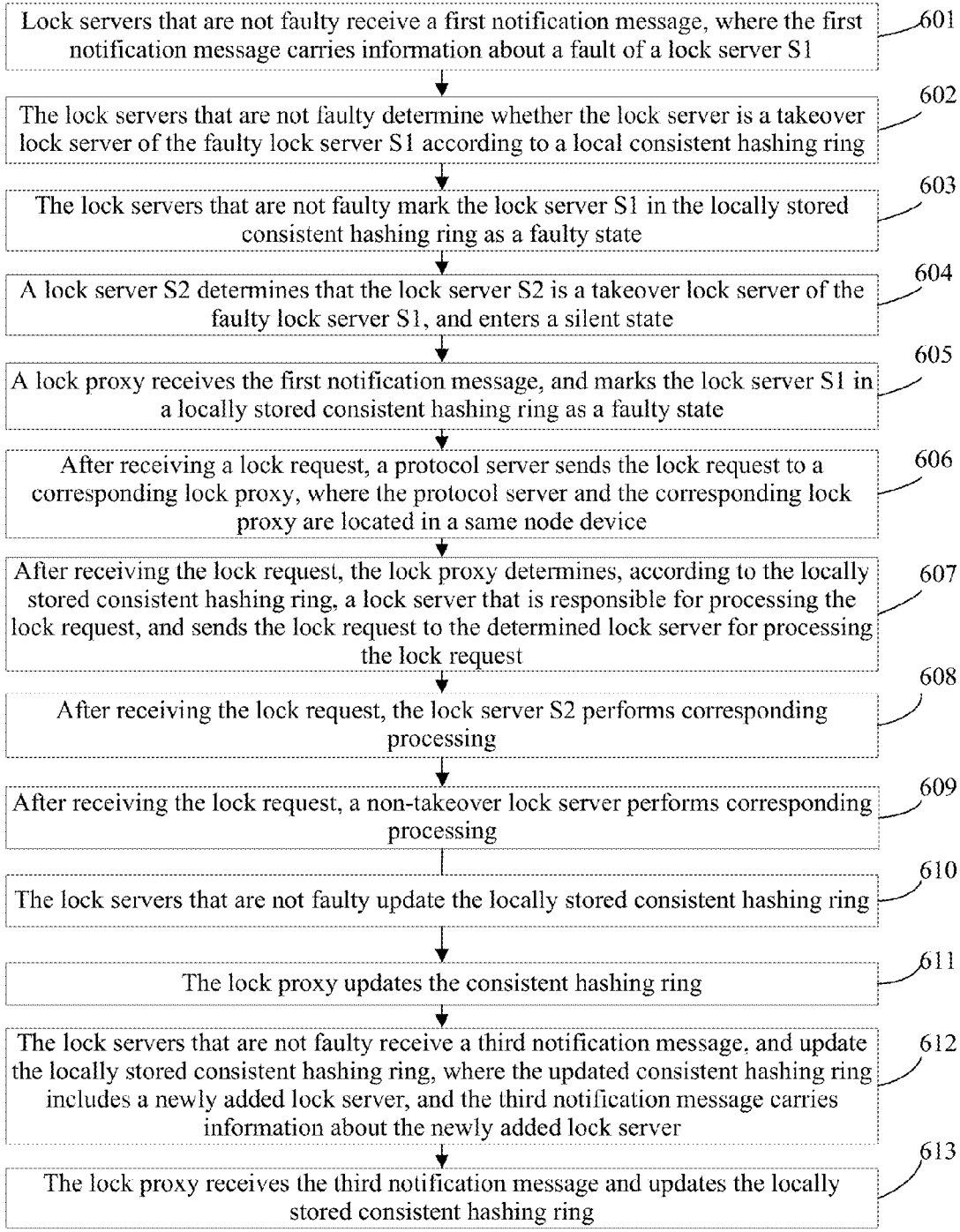

An embodiment of the present application provides another method for processing a fault of a lock server in a distributed system. The procedure is shown in FIG. 6-2. The method is applicable to a distributed system shown in FIG. 6-1.

In the distributed system, there are four node devices, and each node device includes a protocol server, a lock proxy, and a lock server. For example, a protocol server PS1, a lock proxy P1, and a lock server S1 are in a node device 1; a protocol server PS2, a lock proxy P2, and a lock server S2 are in a node device 2; and the rest can be deduced by analogy. A protocol server is in a one-to-one correspondence with a lock proxy in a same node. A lock proxy may be corresponding to multiple lock servers. Certainly, a lock server may also be disposed in another node device. For example, all the four lock servers may be disposed in node 5 (not shown in the figure).

In this embodiment, both lock server takeover relationship information and lock server management range information are determined according to a clockwise direction of a consistent hashing ring. A lock proxy and a lock server each locally store a consistent hashing ring, and the stored consistent hashing rings are the same. A consistent hashing ring in the lock proxy P1 is denoted by HP1; a consistent hashing ring in the lock server S1 is denoted by HS1; and the rest can be deduced by analogy. A consistent hashing ring in this embodiment is obtained by performing calculation according to a name of a node device. As described above, a consistent hashing ring may also be obtained by performing calculation according to an ID of a lock server or an IP address of a node device, and details are not described herein again. A consistent hashing ring and updating of the consistent hashing ring has been described above in detail, and details are not described herein again.

A procedure of the method for processing a fault in a distributed system in this embodiment is as follows:

Step 601: Lock servers that are not faulty receive a first notification message, where the first notification message carries information about a fault of the lock server S1.

When detecting that the lock server S1 is faulty, a management node in the distributed system broadcasts the first notification message to the lock proxies and the lock servers in the distributed system to notify the lock proxies and the lock servers that S1 is faulty. The management node may be located in one of the node devices; or a node device may be independently disposed to implement a management function of the distributed system. A position of a management node does not affect implementation of this embodiment. Therefore, the position of the management node is neither limited herein and nor shown in FIG. 6-1. The management node broadcasts the first notification message in the distributed system; the lock servers that are not faulty and the lock proxies in the distributed system receive the first notification message.

Step 602: The lock servers that are not faulty determine whether the lock servers are a takeover lock server of the faulty lock server S1 according to a local consistent hashing ring. In this embodiment, the lock server S2 determines that the lock server S2 is a takeover lock server of the faulty lock server S1 according to a local consistent hashing ring HS2; the lock server S3 determines that the lock server S3 is not a takeover lock server of the faulty lock server S1 according to a local consistent hashing ring HS3; and the lock server S4, determines that the lock server S4 is not a takeover lock server of the faulty lock server S1 according to a local consistent hashing ring HS4. In this case, both the lock server S3 and the lock server S4 in this embodiment are called non-takeover lock servers, the lock server S2 is called a takeover lock server, and the lock server S1 is a faulty lock server.

Step 603: The lock servers that are not faulty mark the lock server S1 in the locally stored consistent hashing rings of the lock servers that are not faulty as a faulty state. After receiving the first notification message, the lock server S2 may further mark the lock server S1 in the locally stored consistent hashing ring HS2 as a faulty state. In this case, the lock server S2 may further enable a timer and, when the timer expires, update the local consistent hashing ring HS2. Similarly, the lock server S3 and the lock server S4 may also perform a same operation.

There is no strict sequence between step 603 and step 602. The lock servers that are not faulty may first mark the lock server S1 in the locally stored consistent hashing rings of the lock servers that are not faulty as a faulty state; or may first determine whether the lock servers are a takeover lock server of the faulty lock server S1 according to the locally stored consistent hashing ring.

Step 604: The lock server S2 determines that the lock server S2 is a takeover lock server of the faulty lock server S1, and enters a silent state. The takeover lock server that enters the silent state can process only a lock reclaim request and cannot process a locking request. In this case, the lock server S2 may further enable a silence timer; and when the silence timer expires, the lock server S2 exits the silent state. The lock server S3 and the lock server S4 determine that the lock server S3 and the lock server S4 are not takeover lock servers of the faulty lock server S1, and remain a current state unchanged. A non-takeover lock server can process a locking request normally.

After determining that the lock server S2 is the takeover lock server of the faulty lock server S1, the lock server S2 may return a response message to the management node to notify the management node that the lock server S2 is the takeover lock server of the faulty lock server S1. Certainly, the management node may also locally store a same consistent hashing ring. After detecting that the lock server S1 is faulty, the management node determines that the lock server S2 is the takeover lock server of the faulty lock server S1 according to a locally stored consistent hashing ring.

In the method in this embodiment of the present application, when a lock server in the distributed system is faulty, only a takeover lock server of the faulty lock server needs to be silenced, and non-takeover lock servers work normally. In this way, non-takeover lock servers can process a locking request, which enhances reliability of the distributed system.

Step 605: A lock proxy receives the first notification message, and marks the lock server S1 in a locally stored consistent hashing ring as a faulty state. Because the management node in the distributed system broadcasts the first notification message, the lock proxy in the distributed system also receives the first notification message. After receiving the first notification message, the lock proxy marks the lock server S1 in the locally stored consistent hashing ring as a faulty state. For example, after receiving the first notification message, the lock proxy P2 in the distributed system marks the lock server S1 in a locally stored consistent hashing ring HP2 as a faulty state. In this case, the lock proxy may further enable a timer and, when the timer expires, update the locally stored consistent hashing ring. A time length of the timer needs to be equal to a time length of the timer in step 603, and may be slightly greater than or equal to a time length of the silence timer in step 604. In this case, when the takeover lock server S2 exits the silent state, the non-takeover lock server S3 or S4 and the lock proxies can simultaneously update respective locally stored consistent hashing rings.

It should be noted that there is no strict sequence between step 605 and the foregoing steps. Generally, the lock proxy and the lock server can perform the operations simultaneously.

Step 606: After receiving a lock request, a protocol server sends the lock request to a corresponding lock proxy, where the protocol server and the corresponding lock proxy are located in a same node device. In this embodiment of the present application, the lock request may be a lock reclaim request, or may be a locking request. Only the takeover lock server in the distributed system is silent, and other lock servers can work normally. Therefore, after receiving the lock request, the protocol server sends the lock request to the corresponding lock proxy in the same node device. For example, after receiving the lock request, the protocol server PS1 sends the lock request to the lock proxy P1.

A locking request may be sent by a client to the protocol server by using a NAS network, and a format of the locking request is the same as that in an existing implementation manner. Details are not described herein again.

A lock reclaim request may be a lock reclaim request that the client sends to the protocol server after receiving a notification from the protocol server. A solution in the prior art can be used to instruct a particular client to initiate a lock reclaim request, and a format of the lock claim request is the same as that in an existing implementation manner. Details are not described again in this embodiment of the present application.

Step 607: After receiving the lock request, the lock proxy determines, according to the locally stored consistent hashing ring, a lock server that is responsible for processing the lock request, and sends the lock request to the determined lock server for processing the lock request. The lock request in this step may be a locking request, or may be a lock reclaim request.

After receiving the lock request, the lock proxy performs hashing calculation on a unique identifier (an FSID or an FID) of a file carried in the lock request; determines, according to a position of a calculation result in a locally stored consistent hashing ring, a server responsible for processing the lock request; and sends the lock request to the determined lock server for processing the lock request. If the determined lock server for processing the lock request that is in the consistent hashing ring is in a faulty state, a takeover lock server of the lock server for processing the lock request further needs to be determined according to the consistent hashing ring; and the lock proxy sends the lock request to the takeover lock server for processing. For example, after receiving a lock request sent by the protocol server PS1, the lock proxy P1 performs calculation on a file identifier in the lock request by using a consistent hashing algorithm. An obtained result falls in a range between the lock server S4 and the lock server S1. the lock proxy P1 determines, according to a clockwise direction of the locally stored consistent hashing ring, that the received lock request is to be processed by the lock server S1. However, in the locally stored consistent hashing ring, the lock server S1 is in a faulty state. Therefore, the lock proxy P1 determines that the lock server S2 is a takeover lock server of the lock server S1 according to the clockwise direction of the locally stored consistent hashing ring; and the lock proxy P1 sends the lock request to the lock server S2.

Step 608: After receiving the lock request, the lock server S2 performs corresponding processing. If the lock server S2 receives a lock reclaim request, the lock server S2 returns, according to information recorded in a lock permission information table, lock permission information corresponding to a unique identifier of a file carried in the lock reclaim request. In NFS V3, if the lock server S2 receives a lock reclaim request, the lock server S2 returns an OK response message according to the information recorded in the lock permission information table. If the lock server S2 receives a locking request, the lock server S2 checks whether the lock server S2 is in a silent state (for example, check whether a silence timer expires). If the lock server S2 is still in the silent state, the lock server S2 returns a rejection response message; if the lock server S2 is not in the silent state, the lock server S2 allocates lock permission information for the locking request, and returns the lock permission information to the lock proxy P1. After allocating new lock permission information, the lock server S2 may further store a correspondence between the allocated new lock permission information and the unique identifier of the file carried in the locking request in the lock permission information table, where the correspondence is used for processing a subsequent lock reclaim request.

A lock permission information table may be managed by the management node, that is, may be updated and sent to each lock server. The lock permission information table may also be stored by the management node, so that a lock server obtains required information from the management node when necessary. The lock permission information table may also be separately stored and managed by each lock server. In this case, when a lock server allocates new lock permission information, other lock servers need to be instructed to update locally stored lock permission information tables.

The lock permission information is returned by the lock server to the lock proxy that sends the lock request, returned by the lock proxy to the protocol server in the same node, and then returned by the protocol server to the client that initiates the lock request. For example, the lock server S2 returns lock permission information to the lock proxy P1; the lock proxy P1 returns the lock permission information to the protocol server PS1; and then the protocol server PS1 returns the lock permission information to the client that initiates the lock request. A specific processing manner may be the same as that in the prior art, and details are not described again in this embodiment.

Step 609: After receiving the lock request, a non-takeover lock server performs corresponding processing. For example, when receiving a locking request, the lock server S3 allocates new lock permission information for the locking request and returns the lock permission information to the client. Similarly, the lock server S3 may further store, in a lock permission information table, a correspondence between the allocated new lock permission information and the unique identifier of the file carried in a locking request, where the correspondence is used for processing a subsequent lock reclaim request.

It should be noted that, in the procedure of this embodiment, the lock server S3 is not a takeover lock server of the faulty lock server S1. Therefore, the lock server S3 does not enter a silent state, and can process a locking request. However, when there are a relatively large number of lock servers in the distributed system, two lock servers may be faulty, and the lock server S3 may be a takeover lock server of the other faulty lock server. Therefore, when receiving the locking request, the lock server S3 also needs to check whether the lock server S3 is in a silent state. If the lock server S3 is in the silent state, the processing manner is the same as that in step 608, that is, the lock server S3 cannot process the locking request, and directly returns a rejection response message. In this step, to more clearly differentiate a processing manner between a takeover lock server of a faulty lock server and a non-takeover lock server, a step in which the non-takeover lock server checks whether the non-takeover lock server is in the silent state is omitted.

Step 610: The lock servers that are not faulty update the locally stored consistent hashing ring. When preset time arrives, for example, after a timer expires, the lock servers that are not faulty update the locally stored consistent hashing ring, where an updated consistent hashing ring does not include the faulty lock server S1. A second notification message may also be sent by the management node, where the second notification message is used to instruct a lock server to update a locally stored consistent hashing ring, and the second notification message carries information about the faulty lock server. After receiving the second notification message, the lock servers that are not faulty update the locally stored consistent hashing ring, where the updated consistent hashing ring does not include the faulty lock server. The management node may send an updating notification after lock permission information of the faulty lock server is reclaimed, or may send an updating notification within a period of time after detecting the faulty lock server.

In this embodiment of the present application, a consistent hashing ring is obtained by performing hashing calculation according to a name of a node device in which a lock server is located, and a takeover lock server of a faulty lock server is determined according to a clockwise direction of the consistent hashing ring. Therefore, when a lock server is faulty, updating a consistent hashing ring affects only a lock server adjacent to the faulty lock server in the consistent hashing ring, and an affected range is small.

Step 611: The lock proxy updates the consistent hashing ring. When preset time arrives, for example, after a timer expires, the lock proxy updates the locally stored consistent hashing ring, where the updated consistent hashing ring does not include the faulty lock server. The management node may also send an updating notification. After receiving the updating notification, the lock proxy updates the locally stored consistent hashing ring, where the updated consistent hashing ring does not include the faulty lock server.

There is no strict requirement for a time sequence between steps 610 and 611, and steps 610 and 611 may be performed simultaneously. When a node device with a faulty lock server requests re-addition after being restored, or when a node device with a new lock server is added, the method embodiment may further include:

Step 612: The lock servers that are not faulty receive a third notification message, and update the locally stored consistent hashing ring, where the updated consistent hashing ring includes a newly added lock server; the third notification message is used to instruct a lock server to update a locally stored consistent hashing ring, and the third notification message carries information about the newly added lock server. When detecting that a new lock server is added, the management node instructs the lock servers in the distributed system that are not faulty to update the locally stored consistent hashing ring, where the updated consistent hashing ring includes the newly added lock server.

In this embodiment of the present application, a consistent hashing ring is obtained by performing hashing calculation according to a name of a node device in which a lock server is located. Therefore, when a lock server is newly added, only a lock server adjacent to the newly added lock server in the consistent hashing ring is updated, and an affected range is small.

Step 613: The lock proxy receives the third notification message and updates the locally stored consistent hashing ring. When detecting that the new lock server is added, the management node instructs the lock proxy in the distributed system to update the locally stored consistent hashing ring, where the updated consistent hashing ring includes the newly added lock server.

There is no strict requirement for a sequence between steps 612 and 613, and steps 612 and 613 may be performed simultaneously. In addition, there is no strict sequence between steps 612 and 613 and the foregoing steps 601-611. The sequences in this embodiment of the present application are merely exemplary, and are not intended to strictly limit the procedure of the method in the present application.

In the method provided in this embodiment of the present application, when a lock server in a distributed system is faulty, only a takeover lock server of the faulty lock server that is determined according to a particular direction of a consistent hashing ring needs to be silenced, and non-takeover lock servers in the distributed system do not need to be silenced and can process a lock request normally. In this way, most lock requests received by the distributed system can be processed, which minimizes an affected range of the faulty lock server and enhances reliability of the distributed system.

Figure 7:
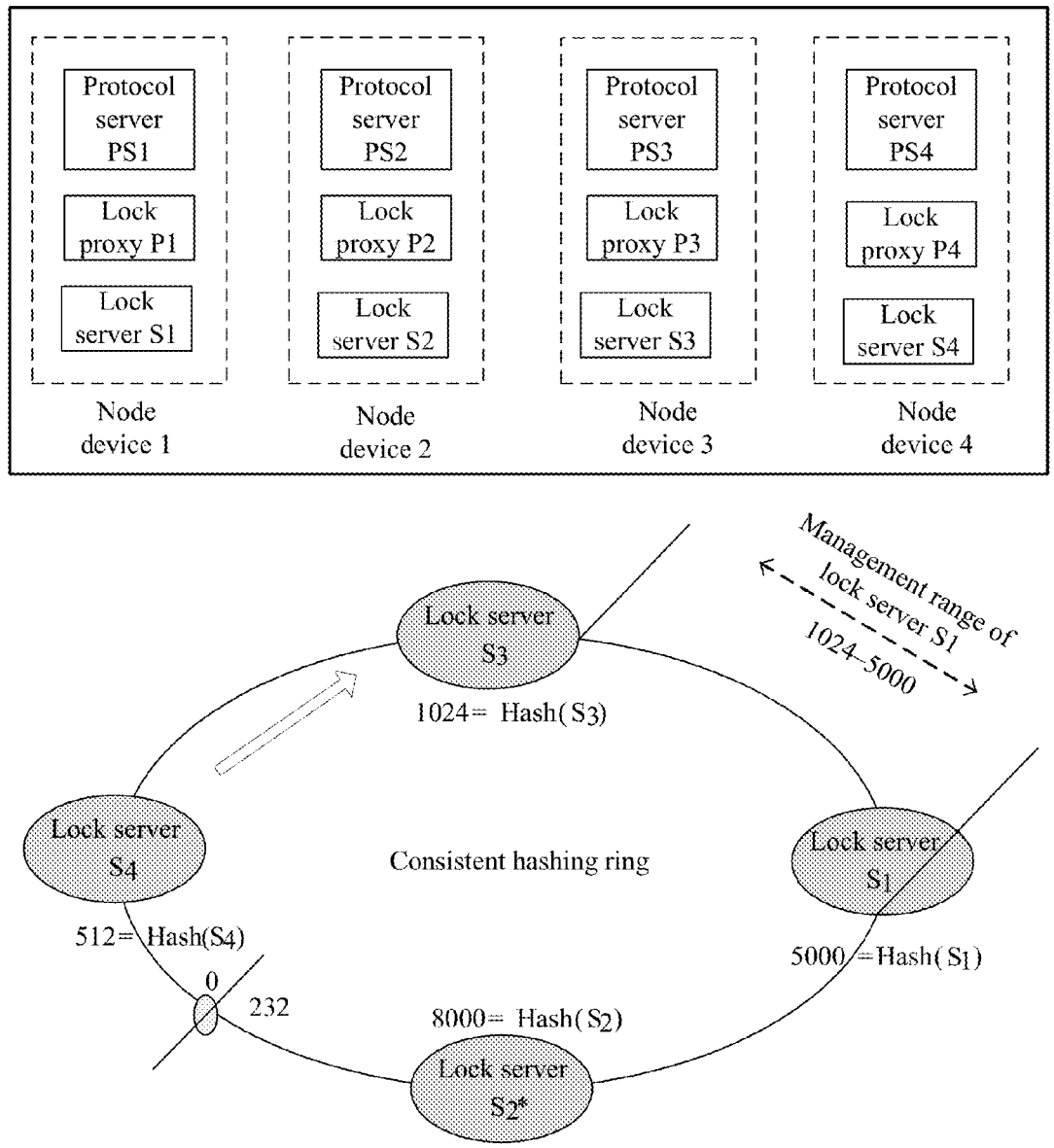
FIG. 7 is a schematic structural diagram of a distributed system for processing a fault of a lock server according to an embodiment of the present application.

An embodiment of the present further provides a distributed system for processing a fault of a lock server. A structure of the distributed system is shown in FIG. 7. As shown in FIG. 7, the distributed system includes four lock servers. For a purpose of differentiation, the lock servers are marked as a lock server S1, a lock server S2, a lock server S3, and a lock server S4. Each lock server locally stores lock server takeover relationship information.

Lock servers in the distributed system that are not faulty receive a first notification message, where the first notification message carries information about a fault of a first lock server.

After receiving the first notification message, a second lock server in the distributed system determines that the second lock server is a takeover lock server of the first lock server according to locally stored lock server takeover relationship information; and the second lock server enters a silent state.

After receiving the first notification message, a third lock server in the distributed system determines that the third lock server is not the takeover lock server of the first lock server according to locally stored lock server takeover relationship information; and when receiving a locking request, the third lock server allocates lock permission information according to the locking request.

If the second lock server that serves as a takeover lock server receives a lock reclaim request, the second lock server returns corresponding lock permission information according to a lock permission information table; if the second lock server receives a locking request, the second lock server returns a rejection response message.

When a lock server in the distributed system is faulty, a processing procedure of another lock server has been described in detail in the foregoing method embodiments, and details are not described herein again.

A manner of recording the lock server takeover relationship information has been described above in detail, and details are not described herein again.

The takeover lock server that enters the silent state may exit the silent state after receiving a notification from a management node, or may exit the silent state when preset time arrives.

After receiving the first notification message, the lock servers in the distributed system that are not faulty may further mark the faulty lock server in locally stored lock server management range information or locally stored lock server takeover relationship information as a faulty state; and, when preset time arrives or after the lock servers receive a second notification message from the management node, the lock servers update the locally stored lock server management range information or the locally stored lock server takeover relationship information, where updated lock server management range information or updated lock server takeover relationship information does not include information about the faulty lock server.

After receiving a third notification message sent by the management node, the lock servers in the distributed system that are not faulty may further update a locally stored consistent hashing ring, where the updated consistent hashing ring includes a newly added lock server; and the third notification message is used to instruct a lock server to update a locally stored consistent hashing ring, and the third notification message carries information about the newly added lock server.

The distributed system further includes four protocol servers and corresponding lock proxies. A protocol server and a corresponding lock proxy are located in a same node device. A lock server may be located in a same node device as a protocol server and a lock proxy; a lock server may also be disposed in another node device. In this embodiment of the present application, the description is provided by using that a lock server is in a same node device as a protocol server and a lock proxy as an example.

Each node device includes a protocol server, a lock proxy, and a lock server. For example, a protocol server PS1, a lock proxy P1, and a lock server S1 are in a node device 1; a protocol server PS2, a lock proxy P2, and a lock server S2 are in a node device 2; and the rest can be deduced by analogy. A protocol server and a lock proxy are in a one-to-one correspondence. That is, after receiving a lock request, the protocol server PS1 sends the lock request to the lock proxy P1; after receiving a lock request, the protocol server PS2 sends the lock request to the lock proxy P2; and the rest can be deduced by analogy. A lock server may be corresponding to multiple lock proxies, that is, the lock server S1 may receive a lock request sent by the lock proxy P1, and may also receive a lock request sent by another lock proxy (for example, the lock proxy P2). The lock request may be a lock reclaim request or a locking request.

After receiving a lock request, the protocol server sends the lock request to a corresponding lock proxy. The protocol server and the corresponding lock proxy are located in a same node device.

After receiving the lock request, the lock proxy determines, according to locally stored lock server management range information, a lock server for processing the lock request; if the determined lock server for processing the lock request is not in a faulty state, the lock proxy sends the received lock request to the lock server for processing the lock request.

After receiving a lock request, the lock proxy determines, according to the locally stored lock server management range information, a lock server for processing the lock request; when the determined lock server for processing the lock request that is in the locally stored lock server management range information is in a faulty state, determines, according to locally stored lock server takeover relationship information, a takeover lock server of the lock server for processing the lock request; and sends the received lock request to the takeover lock server.

The lock server management range information or the lock server takeover relationship information mentioned herein may be recorded by using a table, or may be determined by using a consistent hashing ring. A specific implementation manner has been described above in detail by using an example, and details are not described herein again.

A manner of recording the lock server management range information or the lock server takeover relationship information in the lock proxy is the same as a manner of recording the lock server management range information or the lock server takeover relationship information in the lock server. Rules for updating the lock server management range information or the lock server takeover relationship information in the lock proxy are also the same as those in the lock server. Therefore, lock server management range information or lock server takeover relationship information obtained through updating by the lock proxy is also the same as that obtained through updating by the lock server.

When a lock server takeover relationship is determined by using a consistent hashing ring, after receiving the first notification message, the lock servers in the distributed system that are not faulty determine whether the lock servers are a takeover lock server of the faulty lock server according to a clockwise direction of a locally stored consistent hashing ring. As described above, the lock servers that are not faulty may also determine whether the lock servers are a takeover lock server of the faulty lock server according to a counterclockwise direction of the locally stored consistent hashing ring. If the second lock server determines that the second lock server is the takeover lock server of the first lock server according to the locally stored consistent hashing ring, the second lock server that serves as the takeover lock server enters the silent state. If the second lock server that serves as the takeover lock server receives a lock reclaim request, the second lock server returns corresponding lock permission information according to the lock permission information table. If the second lock server receives a locking request, the second lock server returns a rejection response message.

If the third lock server in the distributed system that is not faulty determines that the third lock server is not the takeover lock server of the first lock server according to a locally stored consistent hashing ring, and when receiving a locking request, the third lock server allocates lock permission information according to the locking request.

After receiving a lock request, the lock proxy determines a lock server for processing the lock request according to a locally stored consistent hashing ring. The consistent hashing rings locally stored by all the lock proxies are the same; and the consistent hashing ring locally stored by a lock proxy and the consistent hashing ring locally stored by a lock server are the same.

After receiving the first notification message, the lock proxy may further mark the first lock server in the locally stored lock server management range information or the locally stored lock server takeover relationship information as a faulty state; and, when preset time arrives or after the lock proxy receives the second notification from the management node, the lock proxy updates the locally stored lock server management range information or the locally stored lock server takeover relationship information. Updated lock server management range information or updated lock server takeover relationship information does not include information about the first lock server.

The lock proxy may further receive the third notification message sent by the management node, where the third notification message is used to instruct a lock proxy to update a locally stored consistent hashing ring, and the third notification message carries information about a newly added lock server; and update the locally stored lock server management range information or the locally stored lock server takeover relationship information. Updated lock server management range information or updated lock server takeover relationship information includes information about the newly added server.

When a lock server in the distributed system is faulty, a processing procedure of the lock proxy has been described in detail in the foregoing method embodiments, and details are not described herein again.

A manner of recording the lock server takeover relationship information has also been described above in detail, and details are not described herein again.

In the distributed system provided in this embodiment of the present application, when a lock server in the distributed system is faulty, each lock server determines whether the lock server is a takeover lock server of the faulty lock server according to locally stored lock server takeover relationship information. When determining that the lock server is not a takeover lock server of the faulty lock server, that is, the lock server is a non-takeover lock server, after receiving a locking request, the non-takeover lock server can normally allocate lock permission information for the locking request. If the lock server determines that the lock server is the takeover lock server of the faulty lock server, the lock server enters a silent state, and after receiving a locking request, the lock server returns a rejection response message. In this way, only the takeover lock server is silent, and non-takeover lock servers can process a locking request normally. Therefore, an affected range of the faulty lock server is minimized, and most lock services can be processed normally. This prevents service interruption caused by a locking request that cannot be processed, or a problem of system breakdown caused by a lock permission collision, and enhances stability of a distributed system.

Figure 8:
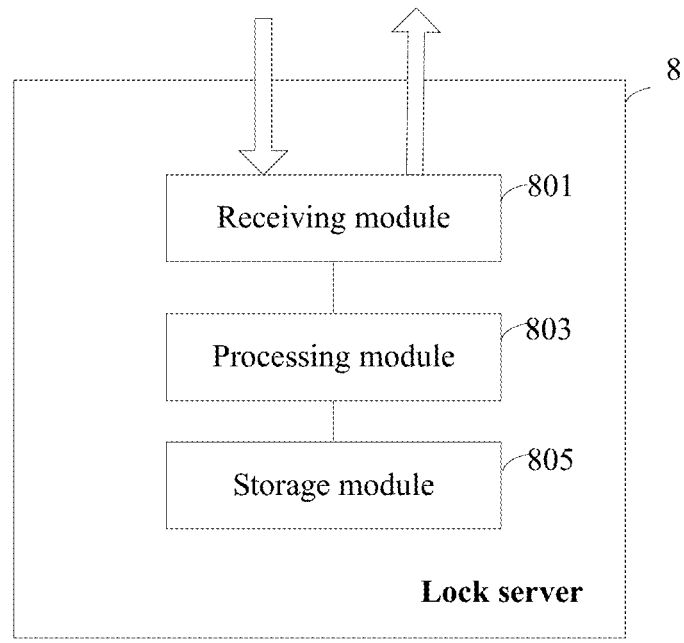
FIG. 8 is a schematic structural diagram of a lock server that implements fault processing in a distributed system according to an embodiment of the present application.

An embodiment of the present application further provides a lock server 8 that implements fault processing in a distributed system. A structure of the lock server 8 is shown in FIG. 8.

The lock server 8 includes a receiving module 801, a processing module 803, and a storage module 805.

The receiving module 801 is configured to receive a first notification message, and send the first notification message to the processing module 803, where the first notification message carries information about a faulty lock server.

The processing module 803 is configured to: after receiving a first notification message, determine whether the lock server is a takeover lock server of the faulty lock server according to lock server takeover relationship information stored in the storage module 805. If the lock server is the takeover lock server of the faulty lock server, the lock server enters a silent state, and the processing module 803 is further configured to enable a silence timer. If the lock server is not a takeover lock server of the faulty lock server, the processing module 803 does not perform processing. After the processing module 803 enables a silence timer, the lock server 8 enters the silent state.

The receiving module 801 is further configured to receive a lock request sent by a lock proxy, and send the received lock request to the processing module 803.

If the lock request is a lock reclaim request, the processing module 803 is further configured to: after receiving the lock reclaim request, return corresponding lock permission information according to a lock permission information table stored in the storage module 805.

If the lock request is a locking request, the processing module 803 is further configured to: after receiving the locking request, determine whether the lock server is in the silent state, that is, to determine whether the silence timer is in an enabled state; if the silence timer is not in the enabled state, the lock server is not in the silent state. The processing module 803 allocates lock permission information for the locking request, and sends the lock permission information to the receiving module 801. If the silence timer is in the enabled state, the lock server is in the silent state, and the processing module 803 sends a rejection response message to the receiving module 801. After allocating the lock permission information for the locking request, the processing module 803 may further store the allocated lock permission information and file information in the locking request in the lock permission information table of the storage module 805.

The receiving module 801 is further configured to return the received lock permission information or the received rejection response message to a lock proxy.

In this embodiment of the present application, the lock server takeover relationship information may be determined by using a lock server takeover relationship table (as shown in Table 1), or may be determined by using a consistent hashing ring (as shown in FIG. 3-1).

That the processing module 803 determines whether the lock server is a takeover lock server of the faulty lock server according to lock server takeover relationship information stored in the storage module 805 may be specifically: The processing module 803 determines whether the lock server is the takeover lock server of the faulty lock server according to a clockwise direction of the consistent hashing ring.

That the processing module 803 determines whether the lock server is a takeover lock server of the faulty lock server according to lock server takeover relationship information stored in the storage module 805 may be specifically: The processing module 803 determines whether the lock server is the takeover lock server of the faulty lock server according to a counterclockwise direction of the consistent hashing ring.

The receiving module 801 is further configured to receive a second notification message, and send the second notification message to the processing module 803, where the second notification message is used to instruct a lock server to update a consistent hashing ring, and the second notification message carries information about the faulty lock server.

The processing module 803 is further configured to update a consistent hashing ring stored in the storage module 805, so that the updated consistent hashing ring does not include the faulty lock server.

The receiving module 801 is configured to receive a third notification message, and send the third notification message to the processing module 803, where the third notification message is used to instruct a lock server to update a consistent hashing ring, and the third notification message further carries information about a newly added lock server.

The processing module 803 is further configured to update the consistent hashing ring stored in the storage module 805, so that the updated consistent hashing ring includes the newly added lock server.

The processing module 803 is further configured to: after receiving the first notification message, mark the faulty lock server in the consistent hashing ring stored in the storage module 805 as a faulty state.

The storage module 805 is configured to store information that needs to be used by the lock server 8, such as the lock server takeover relationship information and the lock permission information table.

A procedure of a method of processing a fault of a lock server that is implemented by the lock server 8 is the same as that of the method described in FIG. 4-2, FIG. 4-3, FIG. 5-2, and FIG. 6-2 and corresponding text, and details are not described herein again.

Figure 9:
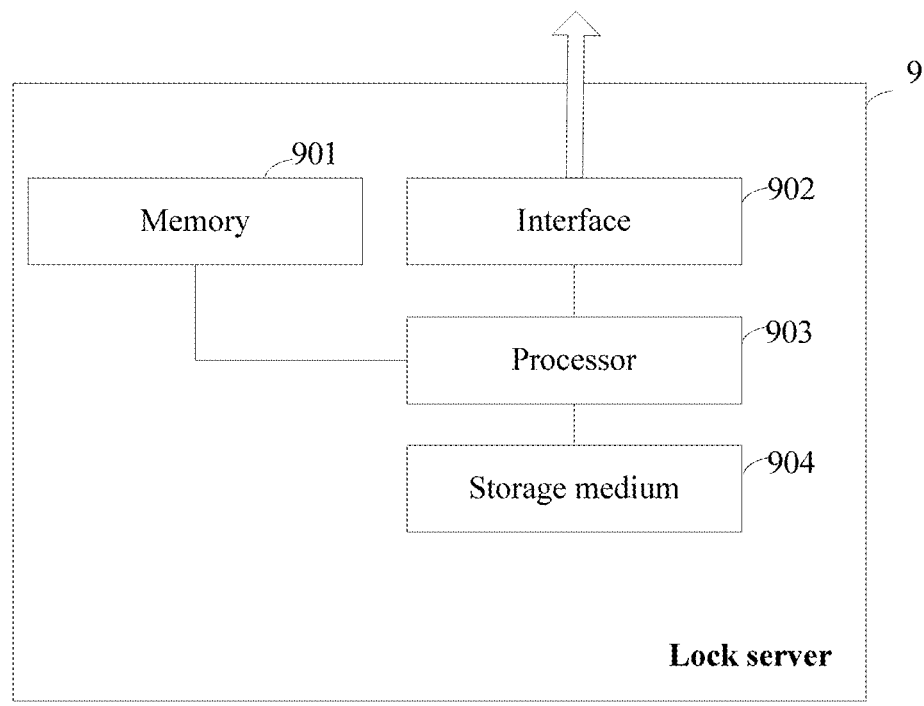
FIG. 9 is a schematic diagram of a lock server device that implements fault processing in a distributed system according to an embodiment of the present application.

An embodiment of the present application further provides another lock server that implements fault processing in a distributed system. A structure of the lock server is shown in FIG. 9. As shown in FIG. 9, the lock server includes: a memory 901, configured to store lock server takeover relationship information and a lock permission information table; an interface 902, configured to provide an external connection; a computer readable medium 903, configured to store a computer program; and a processor 904, connected to the memory 901, the interface 902, and the computer readable medium 903, and configured to implement, by running the program, the foregoing method for processing a fault of a lock server. A procedure is the same as that of the method described in FIG. 4-2, FIG. 4-3, FIG. 5-2, and FIG. 6-2 and corresponding text, and details are not described herein again.

Figure 10:
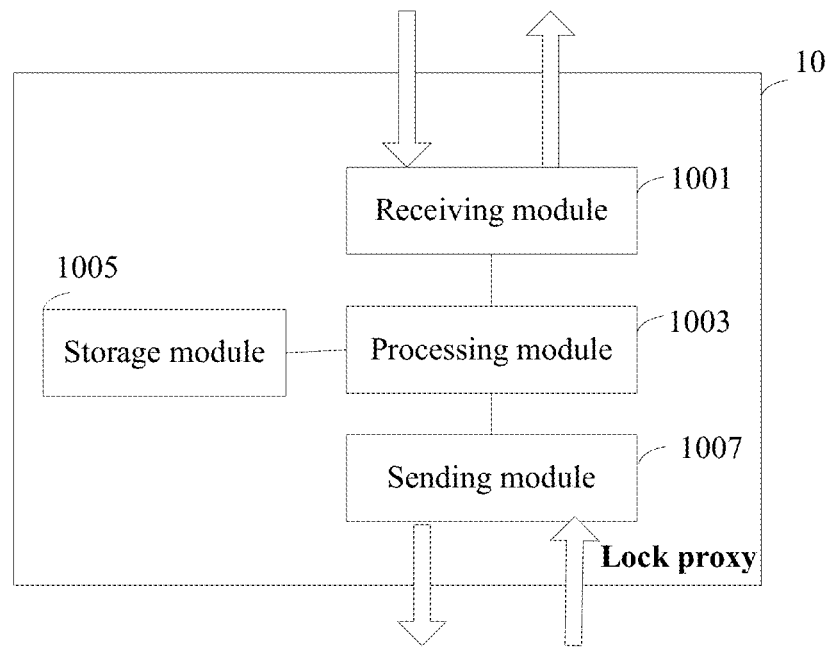
FIG. 10 is a schematic structural diagram of a lock proxy that implements fault processing in a distributed system according to an embodiment of the present application.

An embodiment of the present application further provides a lock proxy apparatus 10 that implements fault processing in a distributed system. A structure of the lock proxy apparatus 10 is shown in FIG. 10.

The lock proxy includes a receiving module 1001, a processing module 1003, a storage module 1005, and a sending module 1007. The receiving module 1001 is configured to receive a lock request sent by a protocol server, and send the received lock request to the processing module 1003, where the lock request may be a lock reclaim request, or may be a locking request.

The processing module 1003 is configured to: after receiving the lock request, determine, according to lock server management range information stored in the storage module 1005, a lock server for processing the lock request, and send the received lock request to the sending module 1007.

The processing module 1003 is further configured to: after receiving a lock request, determine, according to lock server management range information stored in the storage module 1005, a lock server for processing the lock request; when the lock server for processing the lock request that is in the lock server management range information is marked as a faulty state, determine, according to lock server takeover relationship information stored in the storage module 1005, a takeover lock server of the lock server for processing the lock request, and send the received lock request to the sending module 1007.

The sending module 1007 is configured to send the lock request to the determined lock server. When the lock server for processing the lock request that is in the lock server management range information is in a faulty state, the sending module 1007 sends the lock request to the takeover lock server. When the lock server for processing the lock request in the lock server management range information is not in the faulty state, the sending module 1007 sends the lock request to the lock server for processing the lock request.

In this embodiment of the present application, the lock server takeover relationship information and the lock server management range information may be determined by using a lock server information table (as shown in Table 3), or may be determined by using a consistent hashing ring (as shown in FIG. 3-1).

That the processing module 1003 determines, according to lock server management range information stored in the storage module 1005, a lock server for processing the lock request is specifically: the processing module 1003 determines, according to a clockwise direction or a counterclockwise direction of the consistent hashing ring, the lock server for processing the lock request. That the processing module 1003 determines, according to lock server takeover relationship information stored in the storage module 1005, a takeover lock server of the lock server for processing the lock request is specifically: the processing module 1003 determines, according to a same direction of the consistent hashing ring, a takeover lock server of the lock server for processing the lock request. That is, if the processing module 1003 determines, according to the clockwise direction of the consistent hashing ring, the lock server for processing the lock request, the processing module 1003 also determines, according to the clockwise direction of the consistent hashing ring, the takeover lock server of the lock server for processing the lock request; if the processing module 1003 determines, according to the counterclockwise direction of the consistent hashing ring, the lock server for processing the lock request, the processing module 1003 also determines, according to the counterclockwise direction of the consistent hashing ring, the takeover lock server of the lock server for processing the lock request. For a specific manner of determining, refer to the foregoing detailed description, and details are not described herein again.

The receiving module 1001 is further configured to receive a first notification message, and send the first notification message to the processing module 1003, where the first notification message carries information about a faulty lock server.

The processing module 1003 is further configured to: after receiving the first notification message, mark the faulty lock server in a consistent hashing ring stored in the storage module 1005 as a faulty state.

The receiving module 1001 is further configured to receive a second notification message, and send the second notification message to the processing module 1003, where the second notification message is used to instruct a lock server to update a consistent hashing ring.

The processing module 1003 is further configured to update a consistent hashing ring stored in the storage module 1005, so that the updated consistent hashing ring does not include the faulty lock server.

The receiving module 1001 is further configured to receive a third notification message, and send the third notification message to the processing module 1003, where the third notification message is used to instruct a lock server to update a consistent hashing ring, and the third notification message further carries information about a newly added lock server.

The processing module 1003 is further configured to update the consistent hashing ring stored in the storage module 1005, so that the updated consistent hashing ring includes the newly added lock server.

The storage module 1005 is configured to store information that needs to be used by the lock server, such as the lock server takeover relationship information, the lock server management range information, and the lock permission information table.

Figure 11:
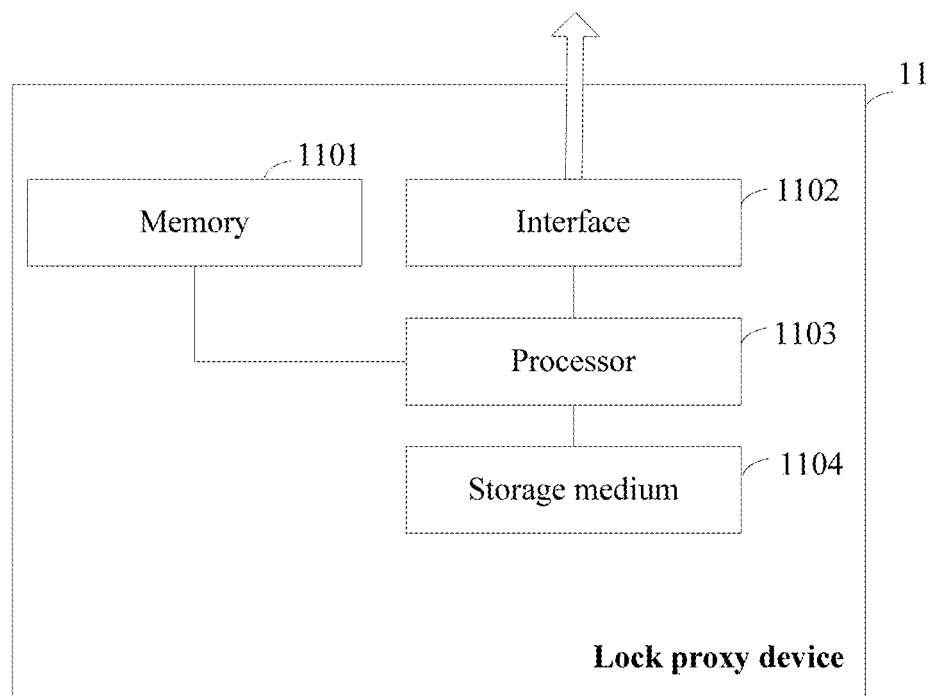
FIG. 11 is a schematic diagram of a lock proxy device that implements fault processing in a distributed system according to an embodiment of the present application.

An embodiment of the present application further provides a lock proxy device that implements fault processing in a distributed system. A structure of the lock proxy device is shown in FIG. 11. As shown in FIG. 11, the lock proxy device includes: a memory 1101, configured to store lock server takeover relationship information and lock server management range information; an interface 1102, configured to provide an external connection; a computer readable medium 1103, configured to store a computer program; and a processor 1104, connected to the memory 1101, the interface 1102, and the computer readable medium 1103, and configured to implement, by running the program, the foregoing method for processing a fault of a lock server. A procedure is the same as that of the method described in FIG. 4-3, FIG. 5-2, and FIG. 6-2 and corresponding text, and details are not described herein again.

Figure 12:
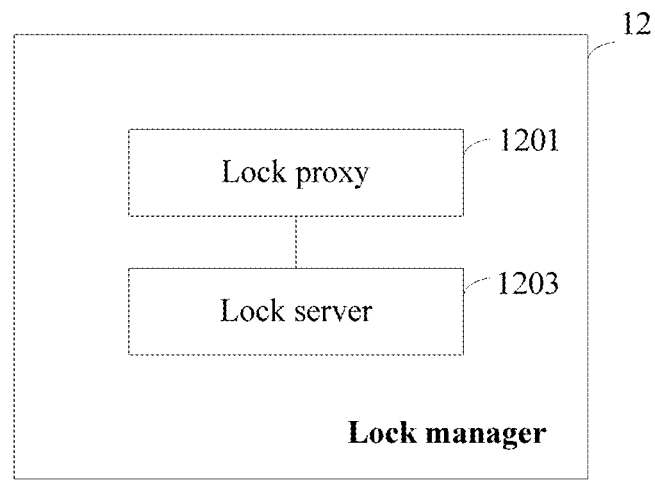
FIG. 12 is a schematic structural diagram of a lock manager that implements fault processing in a distributed system according to an embodiment of the present application.

An embodiment of the present application further provides a lock manager that implements fault processing in a distributed system. A structure of the lock manager is shown in FIG. 12. The lock manager includes a lock proxy 1201 and a lock server 1203. A structure of and a function implemented by the lock server 1203 are shown in FIG. 8 and FIG. 9 and corresponding text. A structure of and a function implemented by the lock proxy 1201 are shown in FIG. 10 and FIG. 11 and corresponding solution description. A procedure of a method of processing a fault of a lock server that is implemented by the lock manager is the same as that of the method described in FIG. 4-2, FIG. 4-3, FIG. 5-2, and FIG. 6-2 and corresponding text, and details are not described herein again.

An embodiment of the present application further provides a protocol server that implements fault processing in a distributed system. The protocol server is configured to receive a lock request sent by an external protocol client, and send the lock request to a lock proxy, where the lock request may be a lock reclaim request, or may be a locking request. A specific procedure of service processing by the protocol server has been described above in detail, and details are not described herein again.

Figure 13:
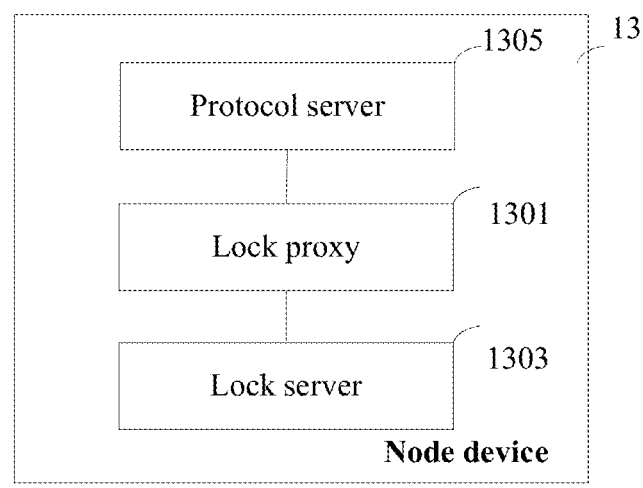
FIG. 13 is a schematic diagram of a node device that implements fault processing in a distributed system according to an embodiment of the present application.

An embodiment of the present application further provides a node device 13 that implements fault processing in a distributed system. A structure of the node device 13 is shown in FIG. 13. The node device 13 includes a protocol server 1305, a lock proxy 1301, and a lock server 1303.

The protocol server 1305 is configured to receive a lock request sent by an external protocol client, and send the lock request to the lock proxy 1301, where the lock request may be a lock reclaim request, or may be a locking request.

The lock proxy 1301 is configured to determine, according to locally stored lock server management range information, a lock server for processing the lock request, and send the lock request to the determined lock server for processing the lock request.

The lock proxy 1301 is further configured to determine, according to stored lock server management range information, a lock server for processing the lock request; and, when the determined lock server for processing the lock request is faulty, determine a takeover lock server according to locally stored lock server takeover relationship information, and send the lock request to the takeover lock server.

The lock server 1303 is further configured to: when the received lock request is a lock reclaim request, feedback corresponding lock permission information according to a stored lock permission information table; the lock server 1303 is further configured to: when the received lock request is a locking request, check whether the lock server 130 is in a silent state; if the lock server 130 is in the silent state, return a rejection response message, or if the lock server 130 is not in the silent state, allocate lock permission information.

A structure of and a function implemented by the lock server 1303 are shown in FIG. 8 and FIG. 9 and corresponding text. A structure of and a function implemented by the lock proxy 1301 are shown in FIG. 10 and FIG. 11 and corresponding text. A procedure of a method of processing a fault of a lock server that is implemented by the node device is the same as that of the method described in FIG. 4-2, FIG. 4-3, FIG. 5-2, and FIG. 6-2 and corresponding text, and details are not described herein again.

A person of ordinary skill in the art may understand that, each aspect of the present application or a possible implementation manner of each aspect may be specifically implemented as a system, a method, or a computer program product. Therefore, each aspect of the present application or a possible implementation manner of each aspect may use forms of hardware only embodiments, software only embodiments (including firmware, resident software, and the like), or embodiments with a combination of software and hardware, which are referred to as "circuit", "module", or "system" herein. In addition, each aspect of the present application or the possible implementation manner of each aspect may take a form of a computer program product, where the computer program product refers to computer-readable program code stored in a computer-readable medium.

The computer-readable medium may be a computer-readable signal medium or a computer-readable storage medium. The computer-readable storage medium includes but is not limited to an electronic, magnetic, optical, electromagnetic, infrared, or semi-conductive system, device, or apparatus, or any appropriate combination thereof, such as a random access memory (RAM), a read-only memory (ROM), an erasable programmable read only memory (EPROM or flash memory), an optical fiber, and a compact disc read only memory (CD-ROM).

A processor in a computer reads computer-readable program code stored in a computer-readable medium, so that the processor can perform a function and an action specified in each step or a combination of steps in a flowchart; an apparatus is generated to implement a function and an action specified in each block or a combination of blocks in a block diagram.

Obviously, a person skilled in the art can make various modifications and variations to the present application without departing from the spirit and scope of the present application. The present application is intended to cover these modifications and variations provided that they fall within the scope of protection defined by the following claims and their equivalent technologies.

What is claimed is:

1. A method for replacing a faulty lock server in a distributed system, wherein the distributed system comprises a plurality of node devices, a first lock server, a second lock server and a third lock server, each lock server controls access to resources in one or more of the node devices, and same lock server takeover relationship information is stored in each lock server; the method comprising:
  receiving, by the second lock server and the third lock server, a notification indicating that the first lock server is faulty;
  determining, by the second lock server and the third lock server, which lock server is a takeover lock server for the first lock server according to the lock server takeover relationship information; and
  based on a determination that the second lock server is the takeover lock server for the first lock server, taking over, by the second lock server, control of the access to resources in one or more node devices that is originally assigned to the first lock server,
  wherein after the taking over, the second lock server enters a silent state and the third lock server remains in normal operation, wherein in the silent state, a received lock reclaim request for reapplying a locking to a resource formerly controlled by the first lock server is processed by the second lock server according to lock permission information of the resource, and a received locking request for locking a resource formerly controlled by the first lock server is rejected by the second lock server;
  wherein the same lock server takeover relationship information stored in each lock server is generated by using a same locally stored consistent hashing ring, and wherein the method further comprises:
  receiving, by the second lock server and the third lock server, a notification to update the consistent hashing ring, wherein the notification to update the consistent hashing ring carries information about the first lock server; and
  updating, by the second lock server and the third lock server, the locally stored consistent hashing ring, wherein the updated consistent hashing ring does not include the first lock server.

2. The method according to claim 1, wherein each node device of the distributed system comprises a protocol server and a lock proxy; wherein a lock request received by a protocol server in a node device is forwarded by the protocol server to a lock proxy in the node device, and the lock proxy sends the lock request to a lock server controlling the resources of the node device; and wherein the lock request is a lock reclaim request or a locking request.

3. The method according to claim 2, wherein each lock proxy locally stores the lock server takeover relationship information and lock server management range information, and the method further comprises:
  determining, by a lock proxy in a node device after receiving a lock request, a lock server for processing the lock request according to the locally stored lock server management range information;
  if the determined lock server for processing the lock request is faulty, determining, by the lock proxy according to the locally stored lock server takeover relationship information, a takeover lock server for the faulty lock server; and
  sending the received lock request to the takeover lock server,
  wherein the lock request is a lock reclaim request or a locking request.

4. The method according to claim 3, wherein the lock server takeover relationship information is determined by using a locally stored consistent hashing ring, and wherein determining, by the lock proxy according to the locally stored lock server takeover relationship information, a takeover lock server for the faulty lock server comprises:
  determining, by the lock proxy according to a clockwise direction or a counterclockwise direction of the locally stored consistent hashing ring, the takeover lock server for the faulty lock server.

5. The method according to claim 4, further comprising:
  marking, by the lock proxy, the faulty lock server in the locally stored consistent hashing ring; and
  at a preset time, updating the locally stored consistent hashing ring, wherein the updated consistent hashing ring does not include the faulty lock server.

6. The method according to claim 2, wherein each lock proxy locally stores the lock server takeover relationship information and lock server management range information, and the lock server management range information and the lock server takeover relationship information are determined by using a locally stored consistent hashing ring; and wherein the method further comprises:
  determining, by a lock proxy in a node device after receiving a lock request, a lock server for processing the lock request according to a clockwise direction or a counterclockwise direction of the locally stored consistent hashing ring;
  if the determined lock server for processing the lock request is faulty, determining, by the lock proxy according to a same direction of the locally stored consistent hashing ring, a takeover lock server for the faulty lock server; and
  sending the received lock request to the takeover lock server,
  wherein the lock request is a lock reclaim request or a locking request.

7. The method according to claim 5, further comprising:
  marking, by the lock proxy, the faulty lock server in the locally stored consistent hashing ring; and
  at a preset time, updating the locally stored consistent hashing ring, wherein the updated consistent hashing ring does not include the faulty lock server.

8. The method according to claim 1, further comprising:
  receiving, by the second lock server and the third lock server, a notification to update the consistent hashing ring, wherein the notification to update the consistent hashing ring carries information about a newly added lock server; and
  updating, by the second lock server and the third lock server, the locally stored consistent hashing ring, wherein the updated consistent hashing ring includes the newly added lock server.

9. A distributed system, comprising:
  a plurality of node devices, a first lock server, a second lock server, and a third lock server;
  wherein each lock server controls access to resources in one or more of the node devices, and same lock server takeover relationship information is stored in each lock server;
  wherein the second lock server and the third lock server are configured to:
    receive a notification indicating that the first lock server is faulty; and
    determine which lock server is a takeover lock server for the first lock server according to the lock server takeover relationship information;
  and wherein the second lock server is further configured to:
    based on a determination that the second lock server is the takeover lock sever for the first lock server, take over control of the access to resources in one or more node devices that is originally assigned to the first lock server, wherein after the taking over, the second lock server enters a silent state and the third lock server remains in normal operation, wherein in the silent state, a received lock reclaim request for reapplying a locking to a resource formerly controlled by the first lock server is processed by the second lock server according to lock permission information of the resource, and a received locking request for locking a resource formerly controlled by the second lock server is rejected by the second lock server;

wherein the same lock server takeover relationship information stored in each lock server is generated by using a same locally stored consistent hashing ring, and wherein the second lock server and the third lock server are configured to:

receive a notification to update the consistent hashing ring, wherein the notification to update the consistent hashing ring carries information about the first lock server; and update the locally stored consistent hashing ring, wherein the updated consistent hashing ring does not include the first lock server.

10. The system according to claim 9, wherein each node device of the distributed system comprises a protocol server and a lock proxy, and wherein a lock request received by a protocol server in a node device is forwarded by the protocol server to a lock proxy in the node device, and the lock proxy sends the lock request to a lock server controlling the resources of the node device; and wherein the lock request is a lock reclaim request or a locking request.

11. The system according to claim 10, wherein each lock proxy locally stores the lock server takeover relationship information and lock server management range information, and after receiving a lock request, a lock proxy in a node device is configured to:

determine a lock server for processing the lock request according to the locally stored lock server management range information;

if the determined lock server for processing the lock request is faulty, determine, according to the locally stored lock server takeover relationship information, a takeover lock server of the faulty lock server; and send the received lock request to the takeover lock server, wherein the lock request is a lock reclaim request or a locking request.

12. The system according to claim 11, wherein the lock server takeover relationship information is determined by using a locally stored consistent hashing ring, and wherein in determining, according to the locally stored lock server takeover relationship information, a takeover lock server for the faulty lock server, the lock proxy is configured to:

determine, according to a clockwise direction or a counterclockwise direction of the locally stored consistent hashing ring, the takeover lock server for the faulty lock server.

13. The system according to claim 12, wherein the lock proxy is further configured to:

mark the faulty lock server in the locally stored consistent hashing ring; and at a preset time, update the locally stored consistent hashing ring, wherein the updated consistent hashing ring does not include the faulty lock server.

14. The system according to claim 10, wherein each lock proxy locally stores the lock server takeover relationship information and lock server management range information, and the lock server management range information and the lock server takeover relationship information are determined by using a locally stored consistent hashing ring; and after receiving a lock request, a lock proxy in a node device is configured to:

determine a lock server for processing the lock request according to a clockwise direction or a counterclockwise direction of the locally stored consistent hashing ring;

if the determined lock server for processing the lock request is faulty, determine, according to a same direction of the locally stored consistent hashing ring, a takeover lock server for the faulty lock server; and send the received lock request to the takeover lock server, wherein the lock request is a lock reclaim request or a locking request.

15. The system according to claim 14, wherein the lock proxy is further configured to:

mark the faulty lock server in the locally stored consistent hashing ring; and at a preset time, update the locally stored consistent hashing ring, wherein the updated consistent hashing ring does not include the faulty lock server.

16. The system according to claim 9, wherein the second lock server and the third lock server are further configured to:

receive a notification to update the consistent hashing ring, wherein the notification to update the consistent hashing ring carries information about a newly added lock server; and update the locally stored consistent hashing ring, wherein the updated consistent hashing ring includes the newly added lock server.

17. A lock server in a distributed system, wherein the distributed system comprises a plurality of node devices and a plurality of lock servers, each lock server controls access to resources in one or more of the node devices, and same lock server takeover relationship information is stored in each lock server, wherein the lock server comprises:

a receiver, a processor, and a storage unit;

wherein the storage unit is configured to store the lock server takeover relationship information;

wherein the receiver is configured to receive a notification indicating that another lock server in the system is faulty;

wherein the processor is configured to:

determine whether the lock server is a takeover lock server for the faulty lock server according to the lock server takeover relationship information; and based on a determination that the lock server is the takeover lock sever for the faulty lock server, take over control of the access to resources in one or more node devices that is originally assigned to the faulty lock server, wherein after the taking over, the lock server enters a silent state and all other non-faulty lock servers in the system remain in normal operation, wherein in the silent state, a received lock reclaim request for reapplying a locking to a resource formerly controlled by the faulty lock server is processed by the lock server according to lock permission information of the resource, and a received locking request for locking a resource formerly controlled by the faulty lock server is rejected by the lock server;

wherein the same lock server takeover relationship information stored in each lock server of the system is generated by using a same locally stored consistent hashing ring, and wherein the processor is further configured to:

receive a notification to update the consistent hashing ring, wherein the notification to update the consistent hashing ring carries information about the faulty lock server; and update the locally stored consistent hashing ring, wherein the updated consistent hashing ring does not include the faulty lock server.

18. The lock server according to claim 17, wherein the processor is further configured to:

receive a notification to update the consistent hashing ring, wherein the notification to update the consistent hashing ring carries information about a newly added lock server; and update the locally stored consistent hashing ring, wherein the updated consistent hashing ring includes the newly added lock server.

19. A node device in a distributed system that comprises a plurality of node devices and a plurality of lock servers, wherein each lock server controls access to resources in one or more of the node devices, wherein the node device comprises circuitries that form a protocol server and a lock proxy apparatus; wherein the lock proxy apparatus is configured to:

receive a lock request from the protocol server;

determine a lock server for processing the lock request according to locally stored lock server management range information;

if the determined lock server for processing the lock request is faulty, determine, according to locally stored lock server takeover relationship information, a takeover lock server for the faulty lock server; and send the received lock request to the takeover lock server, wherein the lock request is a lock reclaim request or a locking request.

20. The node device according to claim 19, wherein the lock server takeover relationship information is determined by using a locally stored consistent hashing ring, and wherein in determining, according to the locally stored lock server takeover relationship information, a takeover lock server for the faulty lock server, the lock proxy apparatus is configured to:

determine, according to a clockwise direction or a counterclockwise direction of the locally stored consistent hashing ring, the takeover lock server for the faulty lock server.

21. The node device according to claim 19, wherein the lock proxy apparatus is further configured to:

mark the faulty lock server in the locally stored consistent hashing ring; and at a preset time, update the locally stored consistent hashing ring, wherein the updated consistent hashing ring does not include the faulty lock server.

22. The node device according to claim 19, wherein the lock server management range information and the lock server takeover relationship information are determined by using a locally stored consistent hashing ring; and in determining a lock server for processing the lock request according to locally stored lock server management range information, the lock proxy apparatus is configured to:

determine a lock server for processing the lock request according to a clockwise direction or a counterclockwise direction of the locally stored consistent hashing ring;

and wherein in determining a takeover lock server if the determined lock server for processing the lock request is faulty, the lock proxy apparatus is configured to:

determining, according to a same direction of the locally stored consistent hashing ring that the faulty lock server is determined, the takeover lock server for the faulty lock server.

23. The node device according to claim 22, wherein the lock proxy apparatus is further configured to:

mark the faulty lock server in the locally stored consistent hashing ring; and at a preset time, update the locally stored consistent hashing ring, wherein the updated consistent hashing ring does not include the faulty lock server.

* * * * *